United States Patent
Kanai et al.

(10) Patent No.: US 7,433,578 B2
(45) Date of Patent: Oct. 7, 2008

(54) INFORMATION RECORDING DEVICE, INFORMATION REPRODUCTION DEVICE, INFORMATION RECORDING METHOD, INFORMATION REPRODUCTION METHOD, INFORMATION RECORDING PROGRAM, INFORMATION REPRODUCTION PROGRAM, AND INFORMATION RECORDING MEDIUM

(75) Inventors: Yuichi Kanai, Moriguchi (JP); Yoshihiro Hori, Moriguchi (JP); Ryoji Ohno, Osaka (JP); Takeo Ohishi, Yokohama (JP); Kenichiro Tada, Tokorozawa (JP); Akihiro Tozaki, Tokorozawa (JP); Tatsuya Hirai, Kawasaki (JP)

(73) Assignees: Sanyo Electric Co., Ltd., Moriguchi-shi, Osaka (JP); Sharp Corporation, Osaka-shi, Osaka (JP); Victor Company of Japan, Limited, Yokohama-shi, Kanagawa (JP); Pioneer Corporation, Meguro-ku, Tokyo (JP); Hitachi, Ltd., Chiyoda-ku, Tokyo (JP)

( * ) Notice: Subject to any disclaimer, the term of this patent is extended or adjusted under 35 U.S.C. 154(b) by 686 days.

(21) Appl. No.: 10/506,503

(22) PCT Filed: Mar. 4, 2003

(86) PCT No.: PCT/JP03/02508

§ 371 (c)(1),
(2), (4) Date: Sep. 3, 2004

(87) PCT Pub. No.: WO03/075275

PCT Pub. Date: Sep. 12, 2003

(65) Prior Publication Data

US 2005/0157528 A1 Jul. 21, 2005

(30) Foreign Application Priority Data

Mar. 5, 2002 (JP) .............................. 2002-107157

(51) Int. Cl.
*H04N 7/087* (2006.01)
(52) U.S. Cl. .......................................... 386/83; 386/95
(58) Field of Classification Search .................. 386/65, 386/68, 83, 95
See application file for complete search history.

(56) References Cited

U.S. PATENT DOCUMENTS

2001/0010754 A1 8/2001 Ando et al.

(Continued)

FOREIGN PATENT DOCUMENTS

| JP | 2000-215651 | 8/2000 |
|----|-------------|--------|
| JP | 2000-333128 | 11/2000 |
| JP | 2000-353375 | 12/2000 |
| JP | 2002-218398 | 8/2002 |
| WO | WO 00/49803 | 8/2000 |

OTHER PUBLICATIONS

Chou, P. et al., The MPEG-4 Intermedia Format (MIF) as an Extension of ASF; Jan. 1998, ISO/IEC JTC1/SC29/WG11 M2969, vol. MPEG98, No. M2969, pp. 1-39.

*Primary Examiner*—Thai Tran
*Assistant Examiner*—Mishawn Dunn
(74) *Attorney, Agent, or Firm*—Drinker Biddle & Reath LLP

(57) ABSTRACT

An information recording apparatus is provided which can record broadcasting information so as to accurately identify and reproduce broadcasting information to be reduced while increasing convenience in reproducing the broadcasting information.

Time control is performed during reproduction in allocation units ALU based on the receiving time of the first packet and the receiving time of the last packet in the allocation unit ALU included in the broadcasting information. The allocation unit ALU includes a plurality of packets. Time control is performed also in access units, each of which includes an I picture, based on the display time information or the receiving time information of the I picture included in the packet.

15 Claims, 14 Drawing Sheets

U.S. PATENT DOCUMENTS

2001/0048804 A1    12/2001   Yoo et al. ..................... 386/69
2002/0037152 A1 *  3/2002    Kato et al. .................... 386/46
2004/0109671 A1 *  6/2004    Kuno et al. ................... 386/68

* cited by examiner

INFORMATION RECORDING DEVICE, INFORMATION REPRODUCTION DEVICE, INFORMATION RECORDING METHOD, INFORMATION REPRODUCTION METHOD, INFORMATION RECORDING PROGRAM, INFORMATION REPRODUCTION PROGRAM, AND INFORMATION RECORDING MEDIUM

TECHNICAL FIELD

The present invention relates to a technical field of an information recording apparatus, an information reproducing apparatus, an information recording method, an information reproducing method, an information recording program, an information reproducing program, and an information recording medium and specifically relates to an information recording apparatus for recording, on a recording medium, broadcasting information distributed via a network or broadcasting, an information recording method, an information recording program, and an information recording medium for recording the information recording program, an information reproducing apparatus for reproducing the recorded broadcasting information from the recording medium, an information reproducing method, an information reproducing program, and an information recording medium for recording the information reproducing program.

BACKGROUND ART

Generally the broadcasting information described above is often distributed after being divided into packets, each having a predetermined amount of information.

In this case, conventionally a receiving time is recorded and controlled in each packet for convenience in reproducing the broadcasting information, and broadcasting information to be reproduced is reproduced after being identified according to the receiving time.

On the other hand, in broadcasting information of recent years, generally image information and the like are distributed while being dynamically compressed.

However, when such broadcasting information is received, recorded, and reproduced, a reproduction image to be reproduced cannot be identified and reproduced accurately by the conventional art, which searches for image information to be reproduced according to a receiving time with a packet serving as a minimum unit.

On the other hand, there is also a demand for a recording/reproducing apparatus having minimum differences from conventional recording/reproducing apparatuses.

DISCLOSURE OF INVENTION

The present invention is devised in view of the problem. An object of the present invention is to provide an information recording apparatus which can record broadcasting information so as to accurately identify and reproduce broadcasting information to be reproduced while increasing convenience for the reproduction of the broadcasting information, an information recording method, an information recording program, an information recording medium for recording the information recording program, an information reproducing apparatus for reproducing the recorded broadcasting information from the recording medium, an information reproducing method, and an information reproducing program.

In order to solve the problem, a first invention provides an information recording apparatus for recording, on a recording medium such as a hard disk, broadcasting information such as a transport stream broadcasted with a plurality of pieces of unit information such as a packet having a predetermined amount of information, the apparatus comprising: a constituting device such as a controller which causes a predetermined number of pieces of the unit information included in the received broadcasting information to constitute a set of unit information such as an allocation unit, a first generating device such as a controller for generating receiving time information including a receiving time of a first received piece of the unit information included in the constituted set of unit information and a receiving time of a last received piece of the unit information included in the constituted set of unit information, a detecting device such as a controller for detecting predetermined specific information included in the unit information, a second generating device such as a controller for generating, based on the detected specific information, corresponding information which includes corresponding time information indicating a time corresponding to the specific information and corresponding position information indicating a position of the specific information in the set of unit information, a third generating device such as a controller for generating identification information which indicates whether the receiving time information and the corresponding information are both recorded on the recording medium, and a recording device such as a controller for recording the generated corresponding information, the generated receiving time information, and the generated identification information on the recording medium.

According to the first invention, the receiving time information for controlling the reproduction of the set of unit information and the corresponding information for controlling the reproduction of specific information are both recorded on a recording medium with broadcasting information. Thus, it is possible to accurately identify the position of the specific information and reproduce the broadcasting information while increasing convenience in reproducing the broadcasting information in sets of unit information.

In a preferred first embodiment of the first invention, according to the information recording apparatus of the first invention, the specific information is predetermined specific image information included in the unit information and the second generating device uses a receiving time of the specific image information as the time corresponding to the specific information.

According to the embodiment, the specific image information serves as the specific information and the receiving time of the specific image information serves as the time corresponding to the specific information, thereby accurately identifying the reproduction position of the broadcasting information with ease.

In a preferred second embodiment of the first invention, according to the information recording apparatus of the first invention, the specific information is predetermined specific image information included in the unit information and the second generating device uses, as the time corresponding to the specific information, a predetermined specific image information output time which corresponds to the specific image information and is broadcasted with the specific image information, the specific image information output time indicating a time when the specific image information is reproduced and outputted after being recorded on the recording medium.

According to the embodiment, the specific image information serves as the specific information and the specific image information output information serves as the time corresponding to the specific information, thereby accurately identifying the reproduction position of the broadcasting information with ease.

In order to solve the problem, a second invention provides an information reproducing apparatus for reproducing the broadcasting information from the recording medium, the broadcasting information having been recorded on the recording medium by the information recording apparatus according to any one of claims 1 to 3, the reproducing apparatus comprising: a first detecting device such as a controller for detecting the identification information from the recording medium, a second detecting device such as a controller for detecting the recorded corresponding information when the detected identification information indicates that the receiving time information and the corresponding information are both recorded on the recording medium, an identifying device such as a controller for identifying a recording position of the broadcasting information to be reproduced on the recording medium by using the detected corresponding information, and a reproducing device such as a decoder for detecting and reproducing, from the identified recording position, the broadcasting information recorded on the recording position.

According to the second invention, when the receiving time information for controlling the reproduction of the set of unit information and the corresponding information for controlling the reproduction of the specific information are both recorded on the recording medium, the broadcasting information to be reproduced is identified and reproduced using the corresponding information. Thus, it is possible to accurately identify the position of the specific information and reproduce the broadcasting information while increasing convenience in reproducing the broadcasting information in sets of unit information.

In order to solve the problem, a third invention provides an information recording method for recording, on a recording medium such as a hard disk, broadcasting information such as a transport stream broadcasted with a plurality of pieces of unit information such as a packet having a predetermined amount of information, the method comprising: a constituting process of causing a predetermined number of pieces of the unit information included in the received broadcasting information to constitute a set of unit information such as an allocation unit, a first generating process of generating receiving time information including a receiving time of a first received piece of the unit information included in the constituted set of unit information and a receiving time of a last received piece of the unit information included in the constituted set of unit information, a detecting process of detecting predetermined specific information included in the unit information, a second generating process of generating, based on the detected specific information, corresponding information which includes corresponding time information indicating a time corresponding to the specific information and corresponding position information indicating a position of the specific information in the set of unit information, a third generating process of generating identification information which indicates whether the receiving time information and the corresponding information are both recorded on the recording medium, and a recording process of recording the generated corresponding information, the generated receiving time information, and the generated identification information on the recording medium.

According to the third invention, the receiving time information for controlling the reproduction of the set of unit information and the corresponding information for controlling the reproduction of the specific information are both recorded on the recording medium with the broadcasting information. Thus, it is possible to accurately identify the position of the specific information and reproduce the broadcasting information while increasing convenience in reproducing the broadcasting information in sets of unit information.

In a preferred first embodiment of the third invention, according to the information recording method of the third invention, the specific information is predetermined specific image information included in the unit information and the second generating process uses a receiving time of the specific image information as the time corresponding to the specific information.

According to the embodiment, the specific image information serves as the specific information and the receiving time of the specific image information serves as the time corresponding to the specific information, thereby accurately identifying the reproduction position of the broadcasting information with ease.

In a preferred second embodiment of the third invention, according to the information recording method of the third invention, the specific information is predetermined specific image information included in the unit information and the second generating process uses, as the time corresponding to the specific information, a predetermined specific image information output time which corresponds to the specific image information and is broadcasted with the specific image information, the specific image information output time indicating a time when the specific image information is reproduced and outputted after being recorded on the recording medium.

According to the embodiment, the specific image information serves as the specific information and the specific image information output information serves as the time corresponding to the specific information, thereby accurately identifying the reproduction position of the broadcasting information with ease.

In order to solve the problem, a forth invention provides an information reproducing method for reproducing the broadcasting information from the recording medium, the broadcasting information having been recorded on the recording medium by the information recording method according to claim 5 or 6, the reproducing method comprising: a first detecting process of detecting the identification information from the recording medium, a second detecting process of detecting the recorded corresponding information when the detected identification information indicates that the receiving time information and the corresponding information are both recorded on the recording medium, an identifying process of identifying a recording position of the broadcasting information to be reproduced on the recording medium by using the detected corresponding information, and a reproducing process of detecting and reproducing, from the identified recording position, the broadcasting information recorded on the recording position.

According to the forth invention, when the receiving time information for controlling the reproduction of the set of unit information and the corresponding information for controlling the reproduction of the specific information are both recorded on the recording medium, the broadcasting information to be reproduced is identified and reproduced using the corresponding information. Thus, it is possible to accurately identify the position of the specific information and reproduce the broadcasting information while increasing convenience in reproducing the broadcasting information in sets of unit information.

In order to solve the problem, the fifth invention provides a recording computer included in an information recording apparatus for recording, on a recording medium, broadcasting information broadcasted with a plurality of pieces of unit information having a predetermined amount of information, the computer being caused to act as: a constituting device which causes a predetermined number of pieces of the unit information included in the received broadcasting information to constitute a set of unit information, a first generating device for generating receiving time information including a receiving time of a first received piece of the unit information included in the constituted set of unit information and a receiving time of a last received piece of the unit information included in the constituted set of unit information, a detecting device for detecting predetermined specific information included in the unit information, a second generating device for generating, based on the detected specific information, corresponding information which includes corresponding time information indicating a time corresponding to the specific information and corresponding position information indicating a position of the specific information in the set of unit information, a third generating device for generating identification information which indicates whether the receiving time information and the corresponding information are both recorded on the recording medium, and a recording device for recording the generated corresponding information, the generated receiving time information, and the generated identification information on the recording medium.

According to the fifth invention, the recording computer operates so that the receiving time information for controlling the reproduction of the set of unit information and the corresponding information for controlling the reproduction of specific information are both recorded on a recording medium with broadcasting information. Thus, it is possible to accurately identify the position of the specific information and reproduce the broadcasting information while increasing convenience in reproducing the broadcasting information in sets of unit information.

In a preferred first embodiment of the fifth invention, according to the information recording program of the fifth invention, the specific information is predetermined specific image information included in the unit information and the recording computer acting as the second generating device is caused to operate using a receiving time of the specific image information as the time corresponding to the specific information.

According to the embodiment, the recording computer operates so that the specific image information serves as the specific information and the receiving time of the specific image information serves as the time corresponding to the specific information, thereby accurately identifying the reproduction position of the broadcasting information with ease.

In a preferred second embodiment of the fifth invention, according to the invention of the fifth invention, the specific information is predetermined specific image information included in the unit information in the information recording program of the fifth invention, and the recording computer acting as the second generating device uses, as the time corresponding to the specific information, a predetermined specific image information output time which corresponds to the specific image information and is broadcasted with the specific image information, the specific image information output time indicating a time when the specific image information is reproduced and outputted after being recorded on the recording medium.

According to the embodiment, the recording computer operates so that the specific image information serves as the specific information and the specific image information output information serves as the time corresponding to the specific information, thereby accurately identifying the reproduction position of the broadcasting information with ease.

In order to solve the problem, the sixth invention provides a reproducing computer included in an information reproducing apparatus for reproducing the broadcasting information from the recording medium, the broadcasting information having been recorded on the recording medium by the information recording apparatus according to the first invention, the computer being caused to act as: a first detecting device for detecting the identification information from the recording medium, a second detecting device for detecting the recorded corresponding information when the detected identification information indicates that the receiving time information and the corresponding information are both recorded on the recording medium, an identifying device for identifying a recording position of the broadcasting information to be reproduced on the recording medium by using the detected corresponding information, and a reproducing device for detecting and reproducing, from the identified recording position, the broadcasting information recorded on the recording position.

According to the sixth invention, when the receiving time information for controlling the reproduction of the set of unit information and the corresponding information for controlling the reproduction of the specific information are both recorded on the recording medium, the reproducing computer operates so that the broadcasting information to be reproduced is identified and reproduced using the corresponding information. Thus, it is possible to accurately identify the position of the specific information and reproduce the broadcasting information while increasing convenience in reproducing the broadcasting information in sets of unit information.

In order to solve the problem, a seventh invention, the information recording program of the fifth invention is recorded so as to be read by the recording computer.

According to the seventh invention, when the information recording program of the fifth invention is recorded, the program is read and executed by the recording computer. Thus, the recording computer is caused to operate so that the receiving time information for controlling the reproduction of the set of unit information and the corresponding information for controlling the reproduction of specific information are both recorded on the recording medium with broadcasting information. Therefore, it is possible to accurately identify the position of the specific information and reproduce the broadcasting information while increasing convenience in reproducing the broadcasting information in sets of unit information.

When the information recording program of the preferred first embodiment of the fifth invention is recorded, the program is read and executed by the recording computer. Thus, the recording computer operates so that the specific image information serves as the specific information and the receiving time of the specific image information serves as the time corresponding to the specific information, thereby accurately identifying the reproduction position of the broadcasting information with ease.

When the information recording program of the preferred second embodiment of the fifth invention is recorded, the program is read and executed by the recording computer. Thus, the recording computer operates so that the specific image information serves as the specific information and the specific image information output information serves as the time corresponding to the specific information, thereby accurately identifying the reproduction position of broadcasting information with ease.

In order to solve the problem, an eighth invention, the information reproducing program of the sixth invention is recorded so as to be read by the reproducing computer.

According to the eighth invention, an information reproducing program of the sixth invention is read and executed by the reproducing computer. Thus, when the receiving time information for controlling the reproduction of a set of unit information and the corresponding information for controlling the reproduction of specific information are both recorded on a recording medium, the reproducing computer operates so that broadcasting information to be reproduced is identified and reproduced using the corresponding information. Thus, it is possible to accurately identify the position of the specific information and reproduce the broadcasting information while increasing convenience in reproducing the broadcasting information in sets of unit information.

BEST MODE FOR CARRYING OUT THE INVENTION

Figure 1:
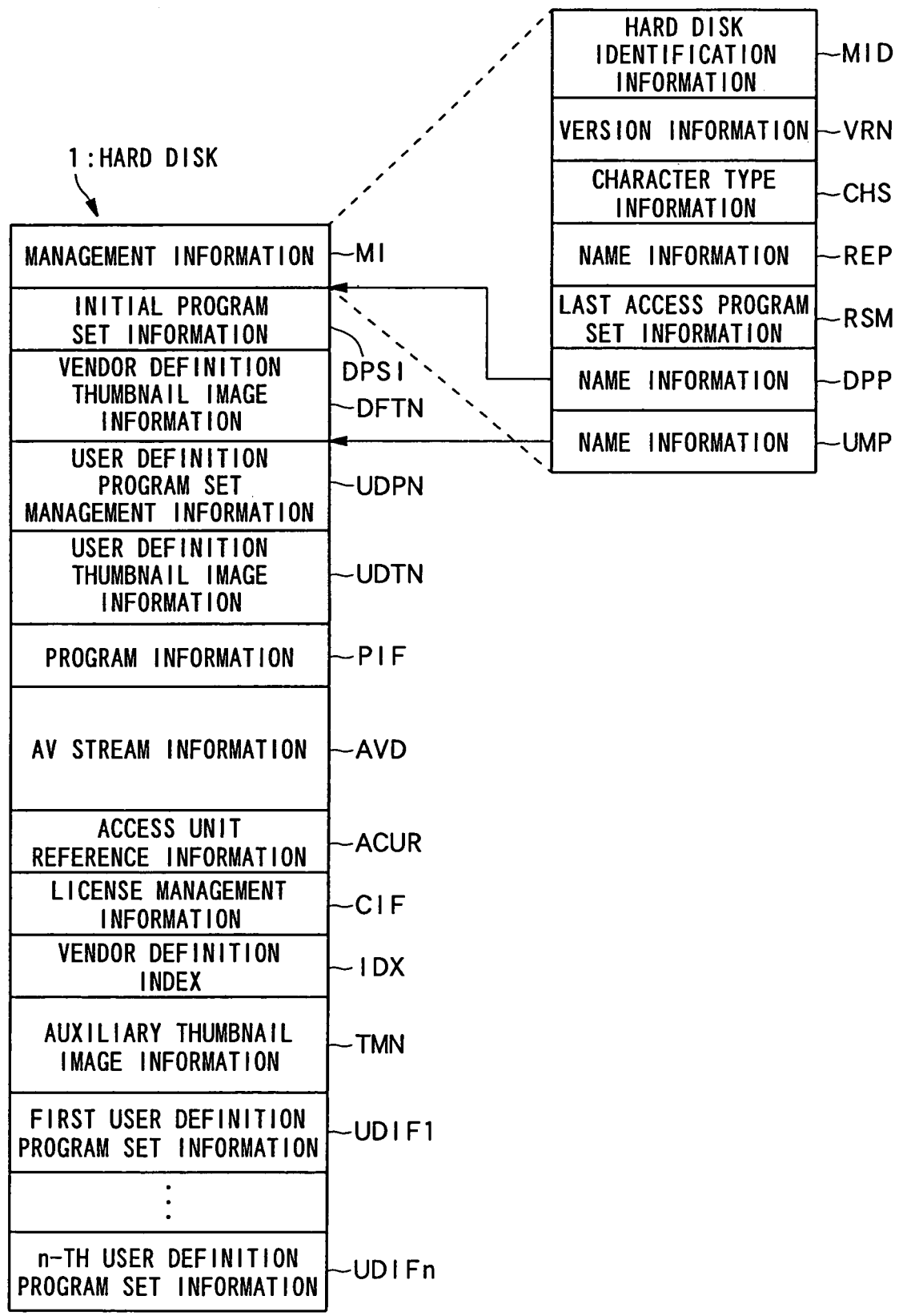
FIG. 1 is a diagram (I) for explaining a recording format of an embodiment.

Preferred embodiments of the present invention will be described below in accordance with the accompanying drawings.

In the following embodiments, the present invention is applied to an information recording apparatus which can record, on a portable hard disk, AV (Audio Visual) information (including music information or image information) distributed via a network such as the Internet, and edit the recorded AV information, the hard disk being processed for copyright protection.

In the following explanation, the AV information is distributed according to the transport stream standard of MPEG (Moving Picture Experts Group) 2, which is a known standard of a moving image compression technique.

(I) Embodiment of a Recording Format

First, prior to a specific explanation about the information recording apparatus of the present embodiment, the following will describe the outline of a logical recording format which is used when the information recording apparatus records the AV information on the hard disk in accordance with FIGS. 1 to 7. FIGS. 1 to 7 schematically show the recording format in a hierarchical manner after the AV information is recorded on the hard disk based on the recording format.

The recording format shown in FIGS. 1 to 7 is a logical recording format used for recording the AV information of the present embodiment on the hard disk. As to the physical recording format used for recording, a known physical format in the hard disk is used as it is.

First, the following will describe the outline of various concepts which are used in the recording format to efficiently manage the contents and recording format of the recorded AV information.

First, in the recording format below, a concept "program" is used as a unit for handling recorded AV information. That is, a program represents one piece of AV information continuously recorded on the hard disk.

When distributed AV information is analog information, for example, when one television program is continuously recorded, the television program acts as a "program." When only a part of the program is continuously recorded, only the continuously recorded part acts as a "program." When a plurality of television programs are continuously recorded at same time, the continuously recorded television programs act as one "program." Meanwhile, when the AV information is digital information, for example, when the AV information is distributed via BS (Broadcast Satellite) digital broadcasting, one event of BS digital broadcasting is defined as a "program."

Second, in the recording format below, a concept "program list" is used to enable the user (user who watches recorded AV information) to freely edit recorded AV information and logically create a new program. That is, the program list is a set of pieces of instruction information (generally also referred to as pointers) used for specifying one program or a part of the program to make a distinction from other programs or other parts. A representative image (hereinafter referred to as a thumbnail image), which represents the contents of AV information included in the program list, can be defined for each program list.

Therefore, for example, when the user performs edits so as to successively reproduce a part of one recorded program and a part of another recorded program in this order, the user combines instruction information indicating the part of the program and instruction information indicating the part of the another program so as to reproduce the instruction information in this order, so that one program list is created. The concept of the program list makes it possible to reproduce AV information in a reproduced form desired by the user without changing the original recording order and so on of the AV information having been recorded on the hard disk.

The following program lists are defined: a program list set by the user who refers to recorded AV information in the above manner (user definition program list), and a program list set in advance by a provider (vendor) who distributes AV information to be recorded (vendor definition program list).

Further, the following thumbnail images are defined: a vendor definition thumbnail image which is set in advance by the vendor and distributed with AV information, and a user definition thumbnail image which is additionally set by the user after distributed AV information is recorded on the hard disk.

Third, in the recording format below, a concept "program set" is used as a set including two or more user definition program lists or vendor definition program lists created based on a reproduced form desired by the user (to be specific, the reproducing order specified by the user for each AV information). The following program sets are defined: an initial program set used for reproducing, in the original recording order, AV information (program) first recorded on the hard disk (a program list included in the initial program set is the vendor definition program list), and a user definition program set including the user definition program list.

Fourth, in the recording format below, a concept "index" is used as a kind of the instruction information. That is, the index is instruction information for specifying one program or a part of the program to make a distinction from other programs or other parts, and the index is provided for enabling the user to facilitate handling of AV information. The following indexes are defined: a vendor definition index which is set in advance by the vendor before distribution, and a user definition index which is additionally set by the user after distributed AV information is recorded on the hard disk. The vendor definition index is distributed as an index file along with AV information, whereas the user definition index is represented as the program list.

The logical recording format of the present embodiment will be discussed below based on the above described various concepts.

As shown in FIG. 1, on a hard disk 1 where necessary AV information has been recorded, the following information is recorded: management information MI which is management information on an overall program recorded on the hard disk 1 and is first referred in the reproduction of recorded AV information, initial program set information DPSI which is management information on the initial program set, vendor definition thumbnail image information DFTN in which image information corresponding to the vendor definition thumbnail image is identified by the name of the image information, user program set management information UDPM which is management information on the user definition program set, user definition thumbnail image information UDTN in which image information corresponding to the user definition thumbnail image is identified by the name of the image information, program information PIF which is management information corresponding to the programs, AV stream information AVD which is an entity of AV information distributed and recorded on the hard disk 1, access unit reference information ACUR which includes, for each access unit, address information and information indicating a total amount of information of one I picture (Intra-coded Picture) in one access unit, the address information indicating the recording position of the I picture on the hard disk 1 in one access unit, which is constituted of image information corresponding to the I picture included in the AV information, license management information CIF for managing a license status of recorded AV information, a vendor definition index IDX, auxiliary thumbnail image information TMN corresponding to an auxiliary image which is used as a thumbnail image but is neither the vendor definition thumbnail image nor the user definition thumbnail image, and user definition program set information UDIF1 to UDIFn serving as management information on the user definition program sets which are defined after AV information is recorded on the hard disk 1 (FIG. 1 has n sets of user definition programs).

As shown in FIG. 1, the management information MI is constituted of hard disk identification information MID (12 bytes) for identifying the hard disk 1 from other hard disks, version information VRN (2 bytes) indicating the version of the hard disk 1, character type information CHS (2 bytes) indicating a character type (attribute) included in recorded AV information, name information REP (128 bytes) indicating a name when the hard disk 1 has a name, a last access program set number RSM which is the number of the last program set reproduced at the completion of the reproduction of AV information recorded on the hard disk 1, name information DPP describing a file name of the initial program set information DPSI (i.e., a so-called path name which specifically indicates the name "initial program set information DPSI"), and name information UMP describing a file name of the user program set management information UDPM (similarly referred to as a path name which specifically indicates the name "user definition program set management information UDPM").

Figure 2:
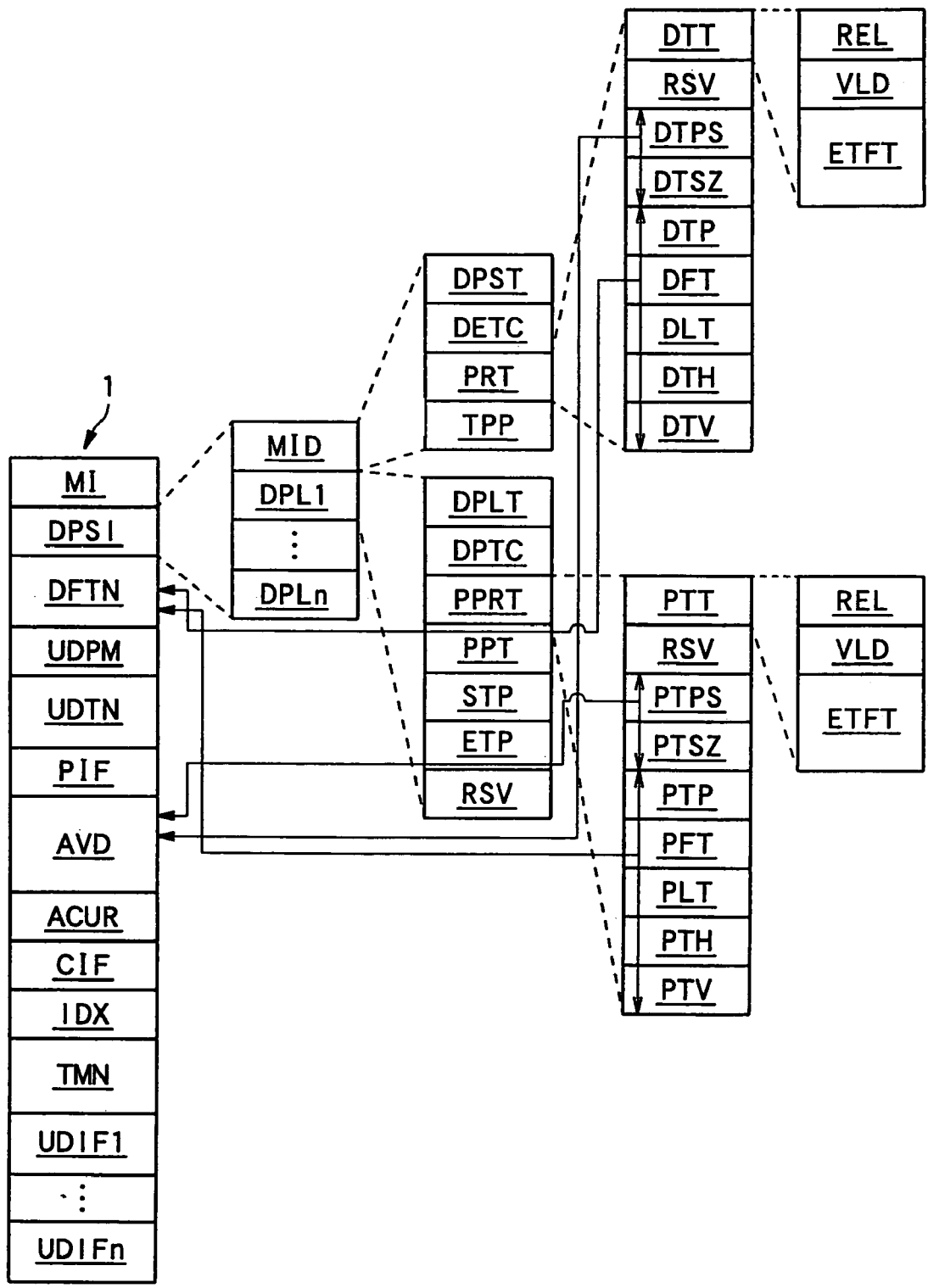
FIG. 2 is a diagram (II) for explaining the recording format of the embodiment.

Referring to FIG. 2, the detailed configuration of the initial program set information DPSI will be described below.

As shown in FIG. 2, the initial program set information DPSI includes initial program set general information DPI which includes name information and so on indicating the name of the initial program set and pieces of vendor definition program list information DPL1 to DPLn which concern a plurality of vendor definition program lists included in the initial program set.

The initial program set general information DPI includes name information DPST (80 bytes) indicating the name of the initial program set, other information DETC (148 bytes) indicating other information of the initial program set general information DPI (including memo information and so on indicating the attribute and so on of the initial program set), initial program set representative image information PRT (156 bytes) on image information for a thumbnail image corresponding to the initial program set (also a thumbnail image representing the overall hard disk 1), and name information TPP (128 bytes) which describes the name of image information corresponding to the initial program set only when a thumbnail image specifier effective flag (described later) is effective.

The initial program set representative image information PRT includes attribute information DTT (1 byte) indicating the attribute of the initial program set representative image, auxiliary information RSV (3 bytes) which is insignificant information of the initial program set representative image information PRT, initial program set representative image recording position information DTPS (8 bytes) which describes the recording position (the recording position of the start of information serving as the I picture) of image information corresponding to the initial program set representative image on the hard disk 1 (in this case, only the I picture of recorded AV information corresponds to the image information) only when the thumbnail image specifier effective flag (described later) is effective, initial program set representative image information amount information DTSZ (4 bytes) which describes an amount of image information (the number of bytes) corresponding to the initial program set representative image only when the thumbnail image specifier effective flag (described later) is effective, name information DTP (128 bytes) describing the name of image information corresponding to the initial program set representative image, offset position information DFT (4 bytes) describing the position of image information corresponding to the initial program set representative image in the vendor definition thumbnail image information DFTN (to be specific, the number of offset bytes from the start of the vendor definition thumbnail image information DFTN), initial program set representative image information amount information DLT (4 bytes) describing an amount of image information (the number of bytes) corresponding to the initial program set representative image, horizontal information amount information DTH (2 bytes) which describes an amount of information in the horizontal direction of image information corresponding to the initial program set representative image stored as a file, and vertical information amount information DTV (2 bytes) which describes an amount of information in the vertical direction of image information corresponding to the initial program set representative image stored as a file.

To be specific, the initial program set representative image recording position information DTPS and the initial program set representative image information amount information DTSZ indicate the recording position and an amount of information of any one of static images included in the AV stream information AVD (the static image is used as the initial program set representative image). Meanwhile, the name information DTP, the offset position information DFT, the initial program set representative image information amount information DLT, the horizontal information amount information DTH, and the vertical information amount information DTV indicate static images which are recorded in the vendor definition thumbnail image information DFTN and are identified by name.

The attribute information DTT includes permission information REL indicating whether the reset of the initial program set representative image should be permitted or not, a thumbnail image specifier effective flag VLD indicating whether the specification of a static image is effective or not, which uses the initial program set representative image recording position information DTPS and the initial program set representative image information amount information DTSZ, and attribute information ETFT indicating the type (attribute) of image information corresponding to an image used as the initial program set representative image when the image is selected from image information other than distributed AV information. In this case, the permission information REL has a value "0" written to it when permitting the reset of the initial program set representative image. When the reset is not permitted, the permission information REL has a value "1" written to it. The thumbnail image specifier effective flag VLD has a value "1" written to it when the specification of a static image is effective, which uses the initial program set representative image recording position information DTPS and the initial program set representative image information amount information DTSZ. When the specification is ineffective, the thumbnail image specifier effective flag VLD has a value "0" written to it.

The vendor definition program list information DPL includes name information DPLT (80 bytes) indicating a name (can be changed by the user) of a vendor definition program list corresponding to the vendor definition program list information DPL, other information DPTC (108 bytes) which is other information (including memo information indicating the attribute and so on of the vendor definition program list) of the vendor definition program list information DPL, vendor definition program list representative image information PPRT (156 bytes) which concerns image information for a thumbnail image corresponding to the vendor definition program list, name information PPT (128 bytes) describing the name of program information (described later) corresponding to a program included in the vendor definition program list, start position information STP (8 bytes) describing the start position of recording a program on the hard disk 1, the program having access according to the vendor definition program list, end position information ETP (8 bytes) describing the end position of recording the program on the hard disk 1, the program having access according to the vendor definition program list, and auxiliary information RSV (4 bytes) which is insignificant information of the vendor definition program list information DPL.

The vendor definition program list representative image information PPRT includes attribute information PTT (1 byte) indicating the attribute of the vendor definition program list representative image, auxiliary information RSV (3 bytes) which is insignificant information of the vendor definition program list representative image information PPRT, vendor definition program list representative image recording position information PTPS (8 bytes) which describes the recording position (the recording position of the start of information serving as the I picture) of image information on the hard disk 1 (in this case, only the I picture of recorded AV information corresponds to the image information) only when the thumbnail image specifier effective flag (described later) is effective, the image information corresponding to the vendor definition program list representative image, vendor definition program list representative image information amount information PTSZ (4 bytes) which describes an amount (the number of bytes) of image information corresponding to the vendor definition program list representative image only when the thumbnail image specifier effective flag (described later) is effective, name information PTP (128 bytes) describing the name of image information corresponding to the vendor definition program list representative image, offset position information DFT (4 bytes) describing the position of image information, which corresponds to the vendor definition program list representative image, in the vendor definition thumbnail image information DFTN (to be specific, the number of offset bytes from the start of the vendor definition thumbnail image information DFTN), vendor definition program list representative image information amount information PLT (4 bytes) describing an amount (the number of bytes) of image information corresponding to the vendor definition program list representative image, horizontal information amount information PTH (2 bytes) which describes an amount of information in the horizontal direction of image information corresponding to the vendor definition program list representative image stored as a file, and vertical information amount information PTV (2 bytes) which describes an amount of information in the vertical direction of image information corresponding to the vendor definition program list representative image stored as a file.

The vendor definition program list representative image recording position information PTPS and the vendor definition program list representative image information amount information PTSZ specifically indicate the recording position and an amount of information of any one of static images included in the AV stream information AVD (the static image is used as the vendor definition program list representative image). Meanwhile, the name information PTP, the offset position information PFT, the vendor definition program list representative image information amount information PLT, the horizontal information amount information PTH, and the vertical information amount information PTV indicate static images which are recorded in the vendor definition thumbnail image information DFTN and are identified by name.

The attribute information PTT includes permission information REL indicating whether the reset of the vendor definition program list representative image should be permitted or not, a thumbnail image specifier effective flag VLD indicating whether the specification of a static image is effective or not, which uses the vendor definition program list representative image recording position information PTPS and the vendor definition program list representative image information amount information PTSZ, and attribute information ETFT indicating the type (attribute) of image information corresponding to an image used as the vendor definition program list representative image when the image is selected from image information other than distributed AV information. In this case, the permission information REL has a value "0" written to it when permitting the reset of the vendor definition program list representative image. When the reset is not permitted, the permission information REL has a value "1" written to it. The thumbnail image specifier effective flag VLD has a value "1" written to it when the specification of a static image is effective, which uses the vendor definition program list representative image recording position information PTPS and the vendor definition program list representative image information amount information PTSZ. When the specification is ineffective, the thumbnail image specifier effective flag VLD has a value "0" written to it.

Figure 3:
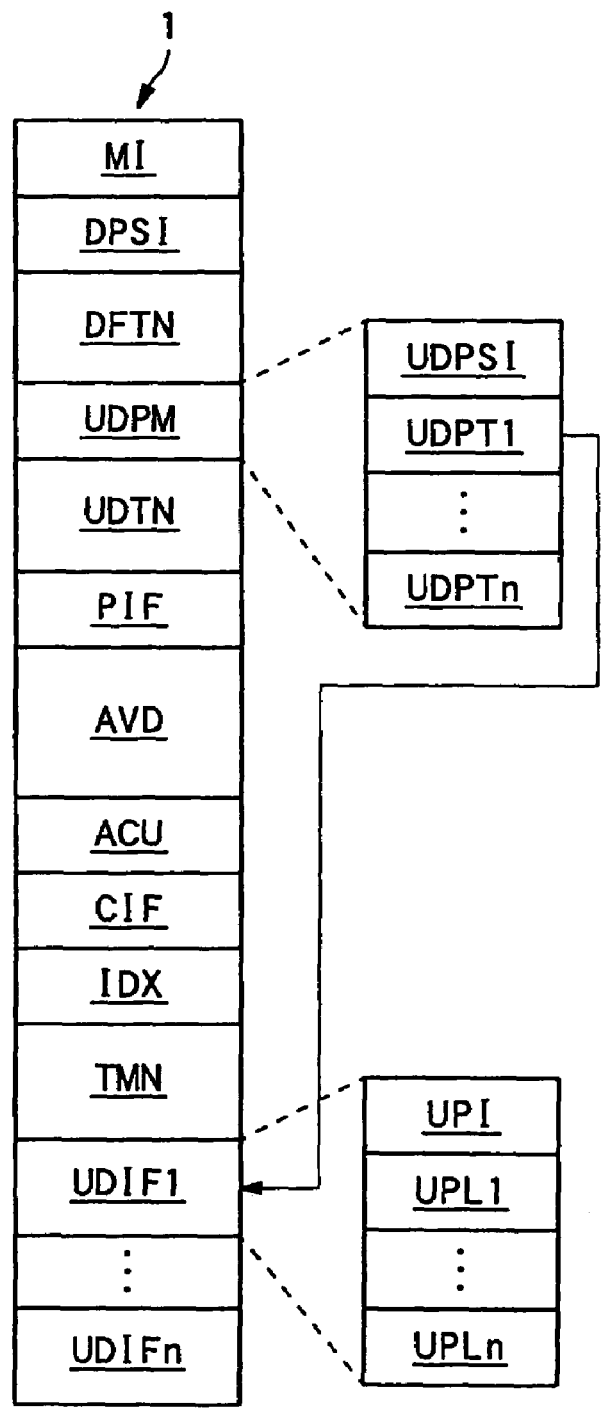
FIG. 3 is a diagram (III) for explaining the recording format of the embodiment.

Referring to FIG. 3, the detailed configuration of the user program set management information UDPM will be described below.

As shown in FIG. 3, the user program set management information UDPM includes user definition program set general information UDPSI which describes total information indicating a total number of the user definition program sets and name information UDPT1 to UDPTn which describe names "user definition program set information UDIF1 to UDIFn" (to be specific, e.g., the name "user definition program set information UDIF1") for each of the user definition program set information UDIF.

As shown in FIG. 3, the user definition program set information UDIF having a name indicated by the name information UDPT includes user definition program set general information UPI which includes name information and so on indicating the name of the user definition program set, and pieces of user definition program list information UPL1 to UPLn which concern a plurality of user definition program lists included in the user definition program set. The user definition program set general information UPI has a same hierarchical structure as the initial program set general information DPI described in FIG. 2. The user definition program list information UPL also has the same hierarchical structure as the vendor definition program list information DPL described in FIG. 2.

Figure 4:
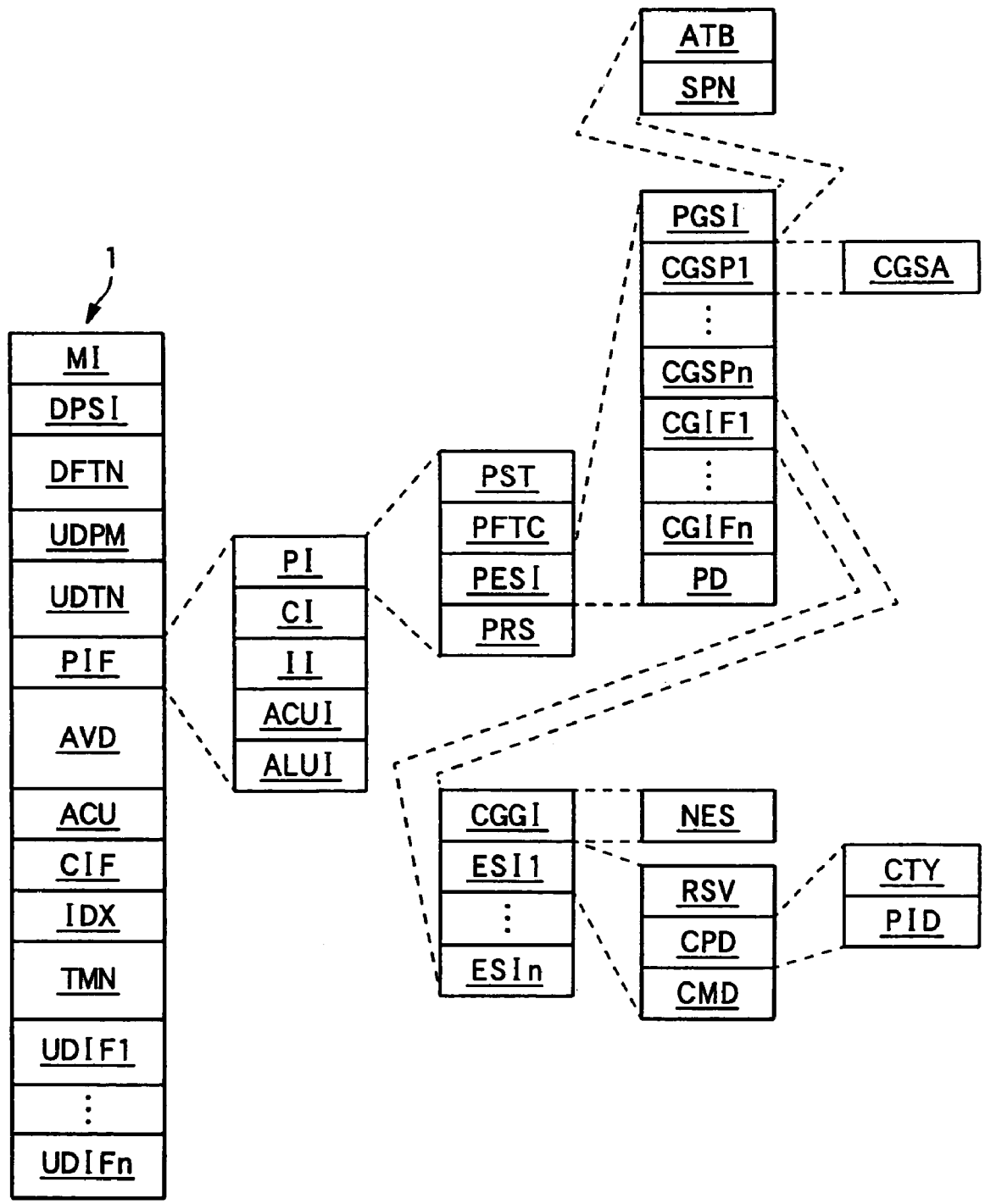
FIG. 4 is a diagram (IV) for explaining the recording format of the embodiment.
Figure 5:
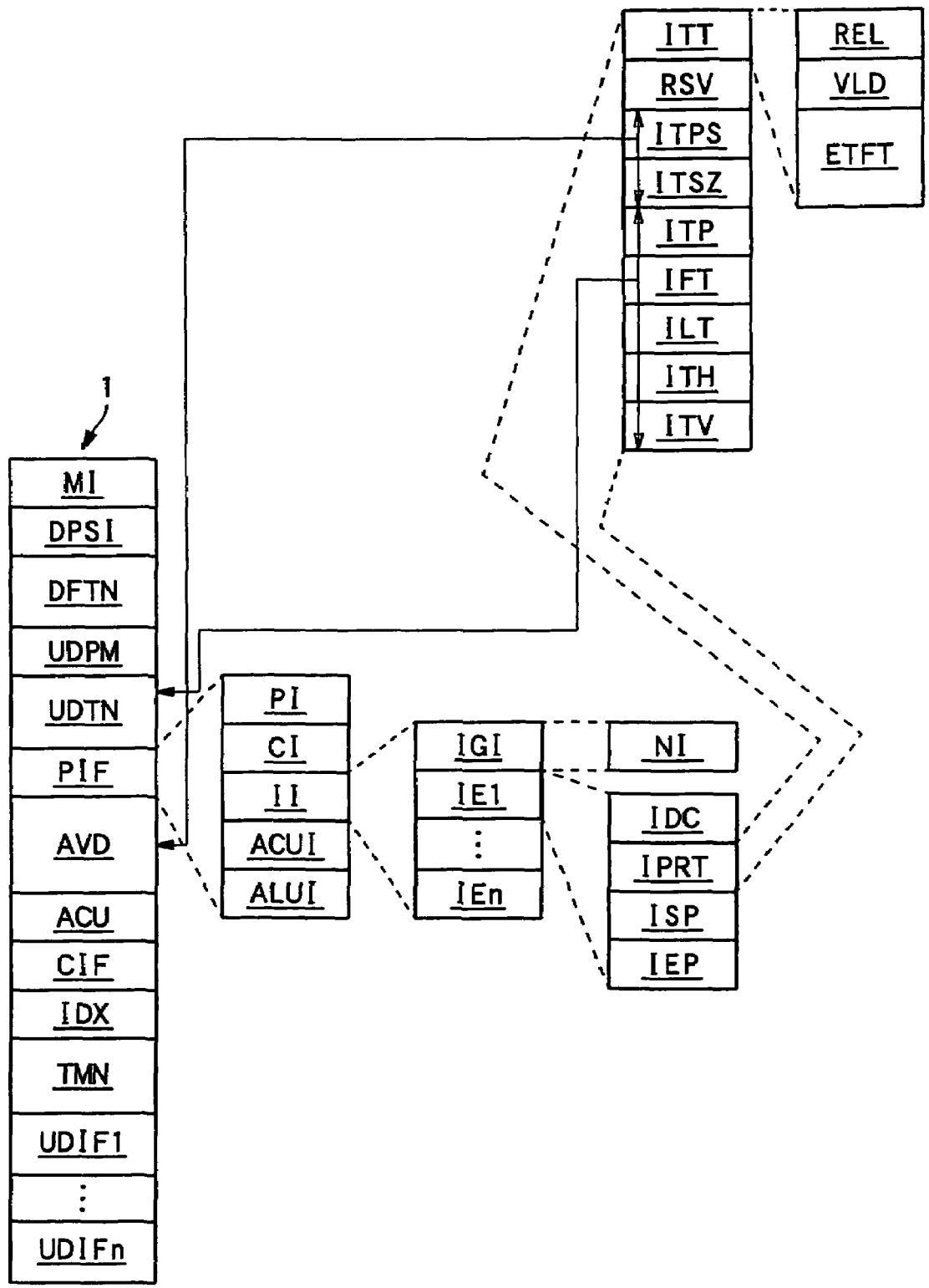
FIG. 5 is a diagram (V) for explaining the recording format of the embodiment.
Figure 6:
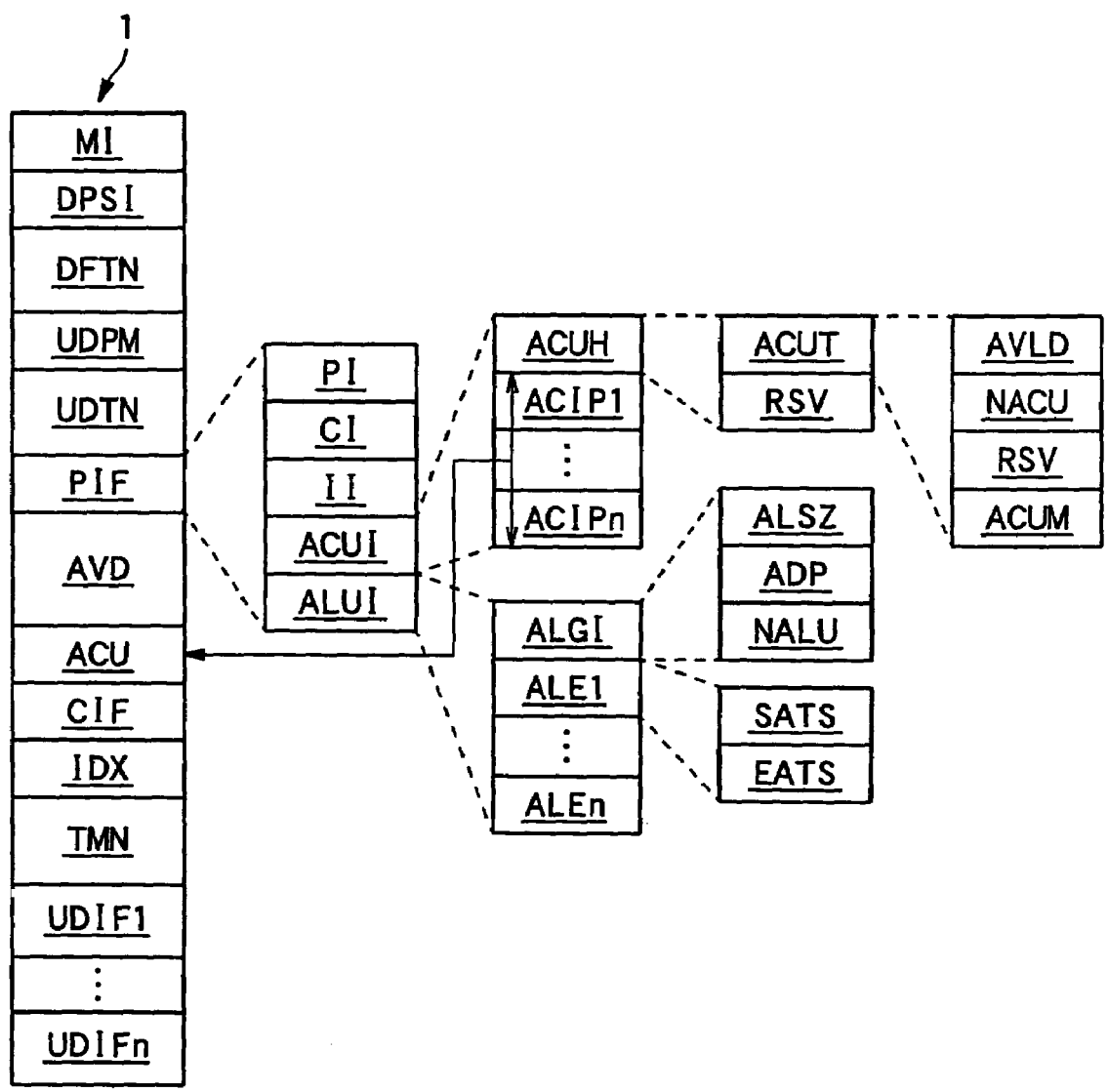
FIG. 6 is a diagram (VI) for explaining the recording format of the embodiment.

Referring to FIGS. 4 to 6, the detailed structure of the program information PIF will be described below.

First, as shown in FIG. 4, the program information PIF is constituted of program general information PI describing general information on a corresponding program, program license information CI describing information on a license corresponding to the program, index information II on an index where the program belongs, access unit information ACUI on an access unit included in the program, and allocation unit information ALUI on an allocation unit which includes a predetermined number of packets constituting a transport stream serving as a format during the distribution of the AV information.

The detailed configuration of the program general information PI will be described below.

As shown in FIG. 4, the program general information PI is constituted of program source information PST (1 byte) indicating the source of a program (whether the program is received via analog broadcasting or BS digital broadcasting), other information PFTC (143 bytes) indicating other information of the program general information PI, program content information PESI (104 bytes) which concerns contents constituting the program (i.e., image, sound, or data which is also generally referred to as an elementary stream), and program recording state information PRS which describes information indicating a recording format when the program is recorded on the hard disk 1.

The program content information PESI is constituted of program content general information PGSI which is general information of the program content information PESI, a plurality of content information group search pointers CGSP1 to CGSPn describing the recording positions of information on the hard disk 1, the information showing the contents of a plurality of distributed contents groups, the contents group being constituted of two or more relevant contents (e.g., image information and sound information to be simultaneously reproduced) of a plurality of contents constituting the program, pieces of content stream group information CGIF1 to CGIFn that specifically describe information showing the contents of the content stream groups, and padding data PD for adjusting an amount of information of the overall program content information PESI.

The program content general information PGSI is constituted of attribute information ATB (1 byte) indicating the attribute of the program and pointer number information SPN (1 byte) indicating the number of content information group search pointers CGSP included in the program content information PESI.

Further, each of the content information group search pointers CGSP includes group information start address information CGSA (1 byte) which describes the recording positions of information showing the contents of corresponding content information groups on the hard disk 1. The positions are indicated as address information relative to the recording position of the start of the program content information PESI on the hard disk 1.

Each piece of the content information group information CGIF is constituted of content information number information NES (1 byte) which describes the number of pieces of content information that is the number of pieces of information on contents included in the content information group information CGIF.

Each piece of the content information ESI is constituted of auxiliary information RSV (1 byte) which is insignificant information of the content information ESI, content packet identification information CPD which includes type information CTY indicating a content type (that is, the type indicating whether a content is image information or sound information) and packet identification information PID for identifying the packet including the content, and type describing information CMD which specifically describes the identified type.

Referring to FIG. 5, the detailed configuration of the index information II will be described below.

As shown in FIG. 5, the index information II is constituted of index general information IGI which is general information of the index information II and pieces of index entry information IE1 to IEn which describe the start positions of a plurality of indexes on the hard disk 1.

The index general information IGI includes index number information NI (1 byte) which describes information indicating the number of indexes included in the program.

Each piece of index entry information IE is constituted of index description information IDC (100 bytes) including other information of the index, index representative image information IPRT (156 bytes) which concerns image information for a thumbnail image corresponding to the index, index start position information ISP which indicates the start position of a region on which a program included in a program list corresponding to the index is recorded on the hard disk 1, and index end position information IEP which indicates the end position of the region on which the program included in the program list corresponding to the index is recorded on the hard disk 1.

The index representative image information IPRT includes attribute information ITT (1 byte) indicating the attribute of the index representative image, auxiliary information RSV (3 bytes) which is insignificant information of the index representative image information IPRT, index representative image recording position information ITPS (8 bytes) which describes the recording position (the position of recording the start of information serving as the I picture) of image information corresponding to the index representative image on the hard disk 1 (in this case, only the I picture of recorded AV information corresponds to the image information) only when the thumbnail image specifier effective flag (described later) is effective, index representative image information amount information ITSZ (4 bytes) which describes an amount (the number of bytes) of image information corresponding to the index representative image only when the thumbnail image specifier effective flag (described later) is effective, name information ITP (128 bytes) describing the name of image information corresponding to the index representative image, offset position information IFT (4 bytes) describing the position of image information corresponding to the index representative image in the user definition thumbnail image information UDTN (to be specific, the number of offset bytes from the start of the user definition thumbnail image information UDTN), index representative image information amount information ILT (4 bytes) describing an amount (the number of bytes) of image information corresponding to the index representative image, horizontal information amount information ITH (2 bytes) which describes an amount of information in the horizontal direction of image information corresponding to the index representative image stored as a file, and vertical information amount information ITV (2 bytes) which describes an amount of information in the vertical direction of image information corresponding to the index representative image stored as a file.

To be specific, the index representative image recording position information ITPS and the index representative image information amount information ITSZ indicate the recording position and an amount of information of any one of static images included in the AV stream information AVD. Meanwhile, the name information ITP, the offset position information IFT, the index representative image information amount information ILT, the horizontal information amount information ITH, and the vertical information amount information ITV indicate static images which are recorded in the user definition thumbnail image information UDTN and are identified by name.

The attribute information ITT includes permission information REL indicating whether the reset of the index representative image should be permitted or not, a thumbnail image specifier effective flag VLD indicating whether the specification of a static image is effective or not, which uses the index representative image recording position information ITPS and the index representative image information amount information ITSZ, and attribute information ETFT indicating the type (attribute) of image information corresponding to an image used as the index representative image when the image is selected from image information other than distributed AV information. In this case, the permission information REL has a value "0" written to it when permitting the reset of the index representative image. When the reset is not permitted, the permission information REL has a value "1" written to it. The thumbnail image specifier effective flag VLD has a value "1" written to it when the specification of a static image is effective, which uses the index representative image recording position information PTPS and the index representative image information amount information ITSZ. When the specification is ineffective, the thumbnail image specifier effective flag VLD has a value "0" written to it.

Referring to FIG. 6, the following will describe the access unit information ACUI and the allocation unit information ALUI.

First, the access unit information ACUI is constituted of an access unit header ACUH serving as header information and name information ACIP1 to ACIPn (each having 128 bytes) describing the names of access unit information included in the access unit reference information ACUR.

The access unit header ACUH includes attribute information ACUT describing the attribute of access unit information and auxiliary information RSV (7 bytes) which is insignificant information of the access unit header ACUH.

The attribute information ACUT includes an access unit effective flag AVLD (1 bit) indicating whether recording or reproduction should be performed in each access unit, unit number information NACU (3 bits) which describes information indicating a total number of access units recorded on the hard disk 1, auxiliary information RSV (3 bits) which is insignificant information of the attribute information ACUT, and access unit handling information ACUM (1 bit) which describes information indicating how to handle the access unit. In this case, the access unit effective flag AVLD has a value "0" written to it when only time information on an allocation unit is recorded. When time information on an allocation unit and time information on an access unit are both recorded, the access unit effective flag AVLD has a value "1" written to it. Further, the access unit handling information ACUM has a value "0" written to it when the access unit is described in an access unit time stamp ACUTS (described later) by using display control time information (also referred to as a presentation time stamp) distributed in AV information. The access unit handling information ACUM has a value "1" written to it when the access unit time stamp ACUTS is described using arrival (reception) time of a packet distributed with the start of a corresponding access unit.

The allocation unit information ALUI is constituted of allocation unit general information ALGI which is general information of allocation unit information and pieces of allocation unit entry information ALE1 to ALEn describing time information on respective allocation units.

The allocation unit general information ALGI is constituted of allocation unit information amount information ALSZ (4 bytes) indicating the number of bytes of information included in one allocation unit, name information ADP (128 bytes) which describes information indicating the name of AV information included in the allocation unit, and unit number information NALU (4 bytes) which describes information indicating a total number of allocation units recorded on the hard disk 1.

Each piece of the allocation unit entry information ALE is constituted of start time stamp information SATS (4 bytes) which describes information indicating time when the first packet included in the corresponding allocation is received, and end time stamp information EATS (4 bytes) which describes information indicating time when the last packet included in the corresponding allocation is received.

Figure 7:
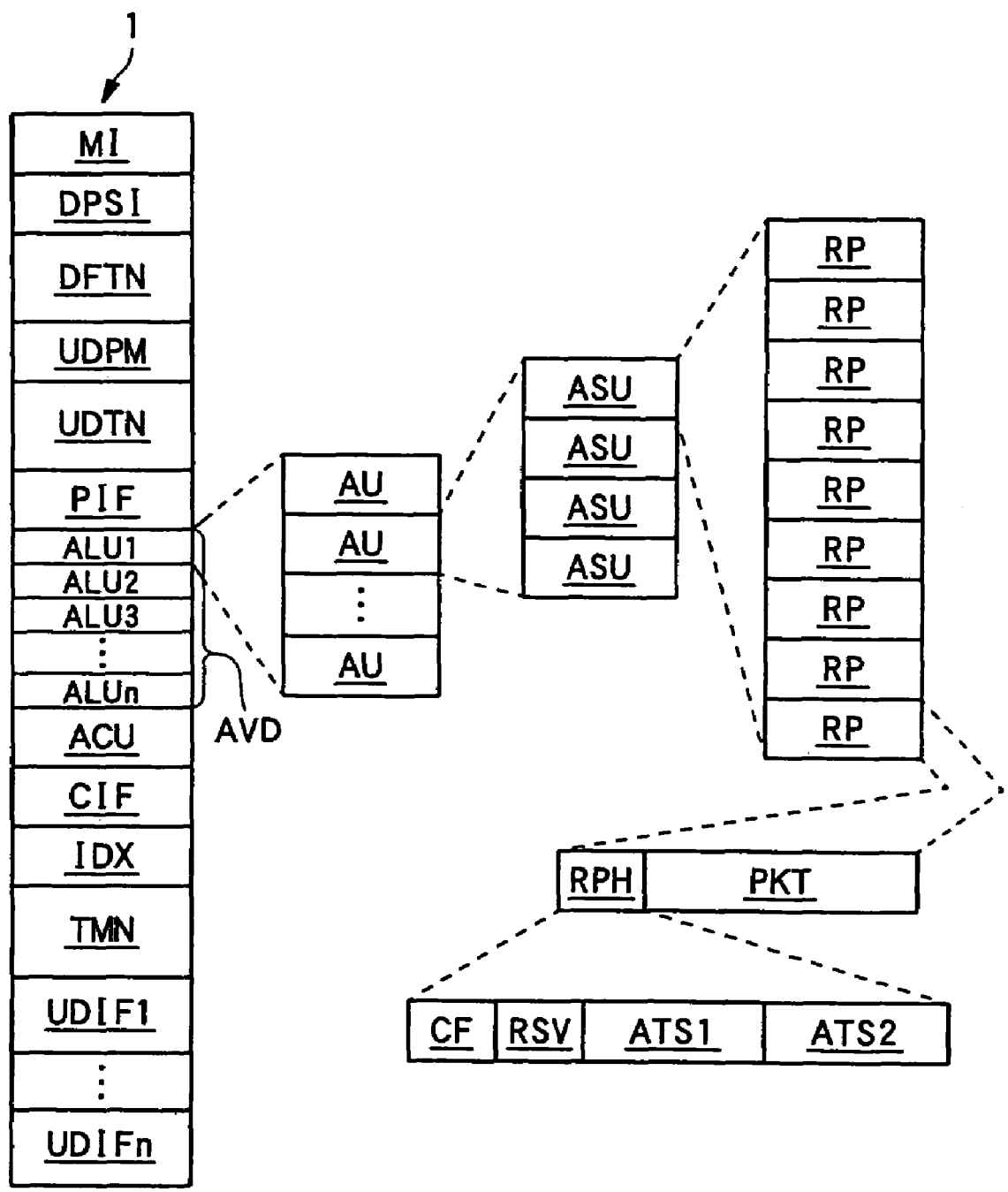
FIG. 7 is a diagram (VII) for explaining the recording format of the embodiment.

Referring to FIG. 7, the detailed configuration of the AV stream information AVD will be described below. FIG. 7 shows a recording format obtained by physically analyzing the AV stream information AVD.

First, as shown in FIG. 7, the AV stream information AVD has one or more allocation units ALU recorded on the hard disk 1 in an integrated manner. Each of the allocation units ALU has, for example, information of about 1 megabyte. Further, each of the allocation units ALU is constituted of one or more aligned units AU.

In this case, each of the aligned units AU is constituted of 12 sectors (one sector has 512 bytes) and is constituted of four aligned sub units ASU. Each of the sub aligned units ASU is constituted of eight recording packets RP. Each of the recording packets RP is obtained by adding a recording packet header RPH of 4 bytes to the front of a packet (including information of 188 bytes, which is a constant amount) PKT of the transport stream. The recording packet header RPH includes a flag CF (1 bit) which describes information indicating whether AV information distributed in the packet PKT is encrypted or not, auxiliary information RSV (2 bits) which is insignificant information of the recording packet header RPH, reception time information ATS1 indicating the reception time of the packet PKT clocked at 90 kHz, and reception time information ATS2 indicating the reception time of the packet PKT secondarily clocked at 27 MHz.

Finally, referring to FIG. 8, the detailed configuration of the access unit reference information ACUR will be described below.

Figure 8:
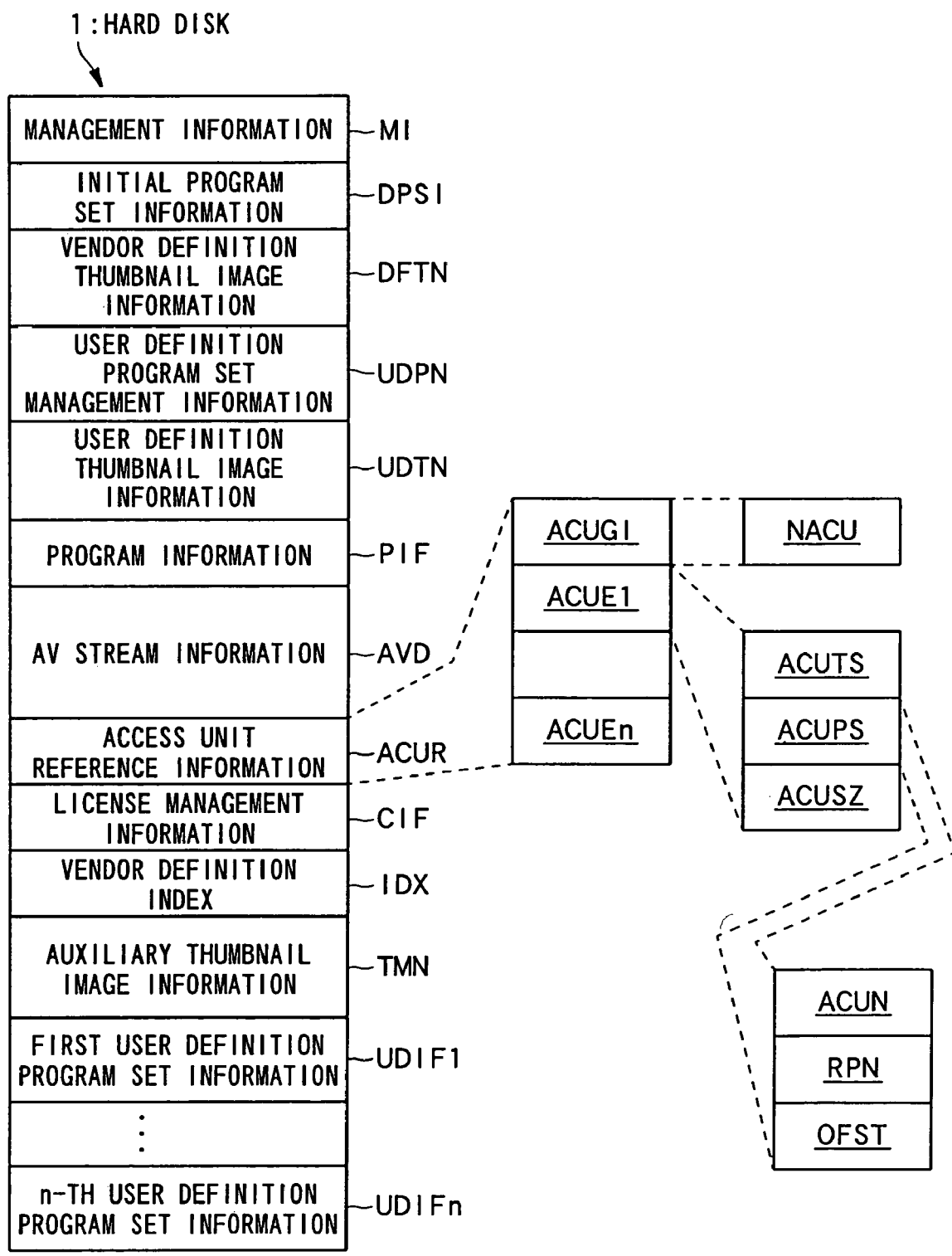
FIG. 8 is a diagram (VIII) for explaining the recording format of the embodiment.

As shown in FIG. 8, the access unit reference information ACUR is constituted of access unit general information ACUGI which is general information of the access unit reference information ACUR and pieces of access unit entry information ACUE1 to ACUEn which describe the recording positions of the plurality of access units on the hard disk 1.

The access unit general information ACUGI describes access unit number information NACU (4 bytes) indicating a total number of access units recorded on the hard disk 1.

Each piece of the access unit entry information ACUE includes an access unit time stamp ACUTS (4 bytes) describing time information on a corresponding access unit, access unit position information ACUPS indicating the recording position of the access unit on the hard disk 1, and access unit information amount information ACUSZ indicating an amount of AV information included in the access unit (in other words, an amount of information of the I picture corresponding to the access unit).

When the access unit time stamp ACUTS is described using display control time information distributed in AV information, the access unit handling information ACUM has a value "0" written to it. Meanwhile, when the access unit time stamp ACUTS is described using the arrival (reception) time of a packet distributed with the start of the corresponding access unit, the access unit handling information ACUM has a value "1" written to it.

The access unit position information ACUPS includes an access unit number ACUN which is a serial number of a corresponding access unit, a recording packet number RPN which is the number of a recording packet RP included in the access unit, and recording position information OFST which is address information indicating the recording position of the access unit on the hard disk 1. In this case, the recording packet number RPN is described as a serial number of the recording packet RP in one access unit. The recording position information OFST describes serial address information from the start position of the hard disk 1.

The above-described logical recording format enables recording and edit of the following embodiment.

(II) Embodiments of the Information Recording Apparatus

The following will describe the configuration and operations of the information recording apparatus which records and edits AV information based on the above-described recording format.

Figure 9:
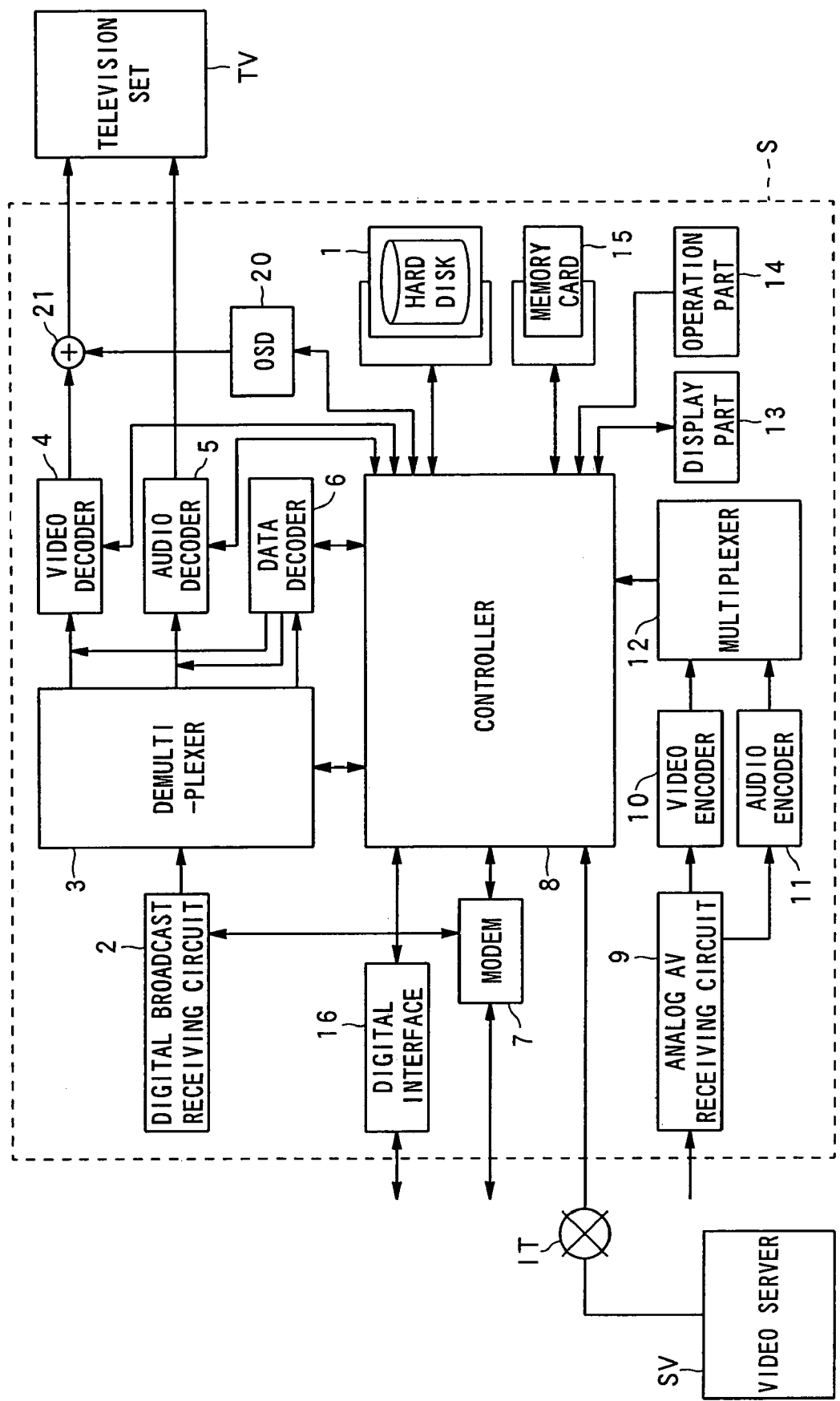
FIG. 9 is a block diagram showing the schematic configuration of an information recording apparatus according to the embodiment.

Referring to FIG. 9, the following will first describe the overall configuration and the outline of operations of the information recording apparatus.

As shown in FIG. 9, an information recording apparatus S of the present embodiment is directly connected to a television set TV provided outside and is connected to an external video server SV via a network IT such as the Internet.

The information recording apparatus S is constituted of the hard disk 1 serving as a recording medium for recording AV information in the recording format, a digital broadcast receiving circuit 2, a demultiplexer 3, a video decoder 4 serving as a reproducing device, an audio decoder 5, a data decoder 6, a modem 7, a controller 8 serving as a constituting device, a first generating device, a second generating device, a detecting device, a recording device, and an identifying device, an analog AV receiving circuit 9, a video encoder 10, an audio encoder 11, a multiplexer 12, a display part 13, an operation part 14, a memory card 15 which is a kind of a solid-state recording medium, a digital interface 16, an OSD 20, and an adding part 21.

The outlines of operations will be discussed below.

The video server SV generates, according to the format of the transport stream, AV information having been accumulated therein and distributes the AV information to the controller 8 in the information recording apparatus S via the network IT.

Analog terrestrial broadcasting, which is prevalent at present, is received by an analog AV receiving circuit via an antenna (not shown), and image information and sound information are separated from the received broadcasting. The image information is outputted to the video encoder 10 and the sound information is outputted to the audio encoder 11.

Then, the video encoder 10 encodes the image information in a digital manner and outputs the image information to the multiplexer 12.

Simultaneously, the audio encoder 11 encodes the sound information in a digital manner and outputs the sound information to the multiplexer 12.

With these operations, the multiplexer 12 alternately superimposes the digitized image information and sound information and outputs the information to the controller 8.

For example, AV information and so on distributed via a high speed serial network is received by the digital interface 16 and is outputted to the controller 8.

For example, the foregoing BS digital broadcasting and the like is received by the antenna (not shown), is decoded by the modem 7 operating under the control of the controller 8, and is outputted to the demultiplexer 3 via the digital broadcast receiving circuit 2.

Subsequently, under the control of the controller 8, the demultiplexer 3 separates image information, sound information, and data information (e.g., program information and the like for a computer corresponds to the data information) from AV information included in the inputted BS digital broadcasting. The image information, the sound information, and the data information are outputted respectively to the video decoder 4, the audio decoder 5, and the data decoder 6 and are separately decoded under the control of the controller 8. At this point, data information generated by decoding in the decoder 6 is superimposed on image information or sound information as necessary before being decoded.

Thereafter, the decoded image information and sound information are outputted for viewing as they are to the external television set TV.

At this point, the controller 8 exercises control over the series of processing operations, instructions and so on required for the control are provided by the user on the operation part 14, and an operation signal corresponding to the instruction is inputted from the operation part 14 to the controller 8, so that the controller 8 recognizes the contents of the instruction and performs necessary processing. Further, regarding an operating state and so on in the control, the corresponding display signal is generated by the OSD 20, the generated display signal is added to the output of the video decoder 4 as necessary by the adding part 21, and the result is displayed on the television set TV.

Additionally, the AV information to be accumulated in the hard disk 1 is decoded by the video decoder 4 or the audio decoder 5 and is outputted to the controller 8. Then, the controller 8 reconfigures the decoded image information and so on according to the recording formats and records the information on the hard disk 1.

Moreover, when AV information recorded on the hard disk 1 is edited, the AV information is read once from the hard disk 1 and is subjected to necessary edits based on operations of the operation part 14.

On the other hand, the memory card 15 accumulates the image information to be used as a thumbnail image, and the controller 8 duplicates the thumbnail image to the hard disk 1 and uses the image as the user definition thumbnail image.

The thumbnail image may be duplicated on the hard disk 1 via the digital interface 16 and a flexible disk drive and so on (not shown) as the user definition thumbnail image.

The following will specifically describe recording and reproduction according to the present embodiment.

(A) Embodiments of Recording

Figure 10:
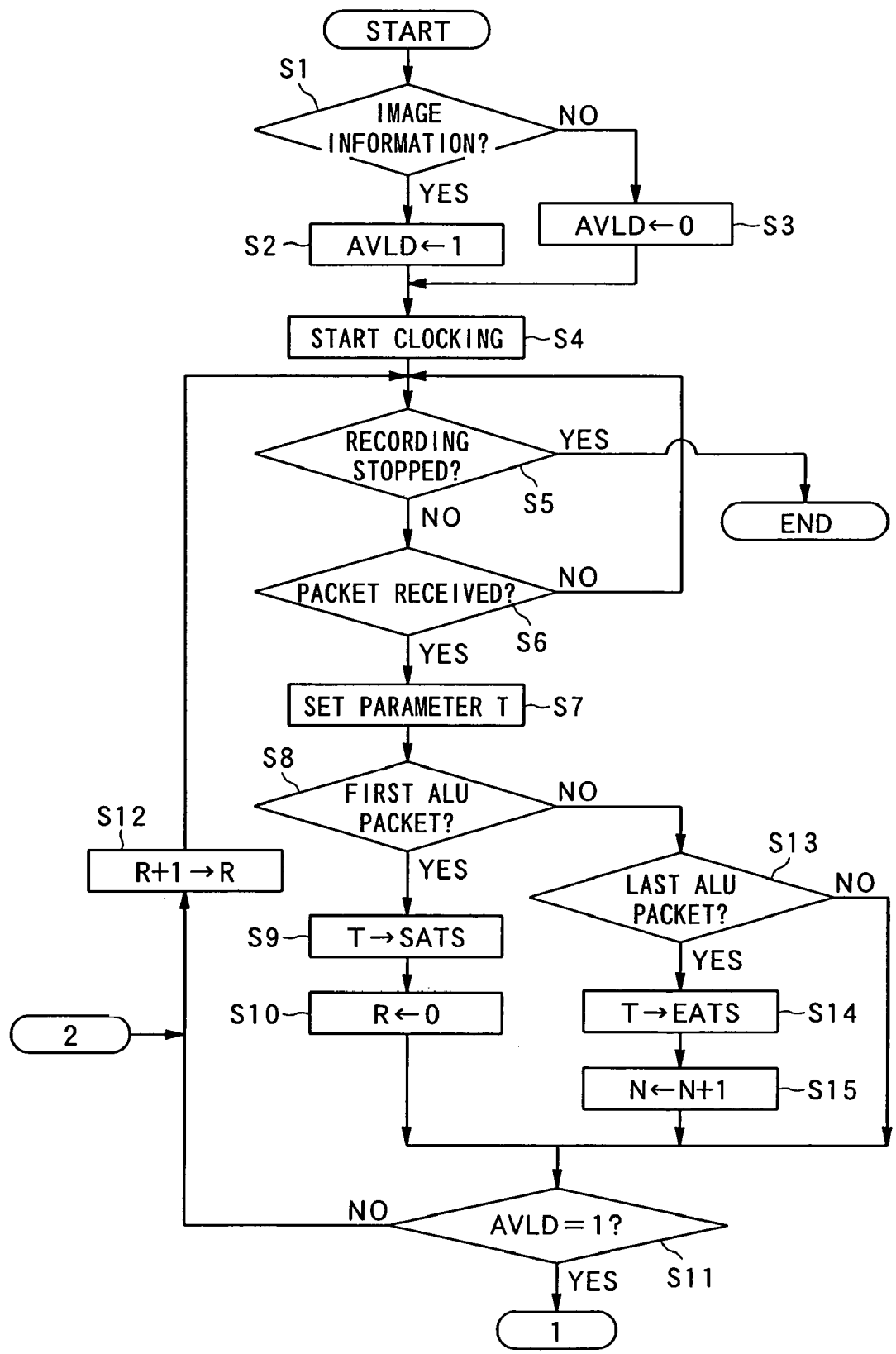
FIG. 10 is a flowchart (I) showing the recording of the embodiment.
Figure 11:
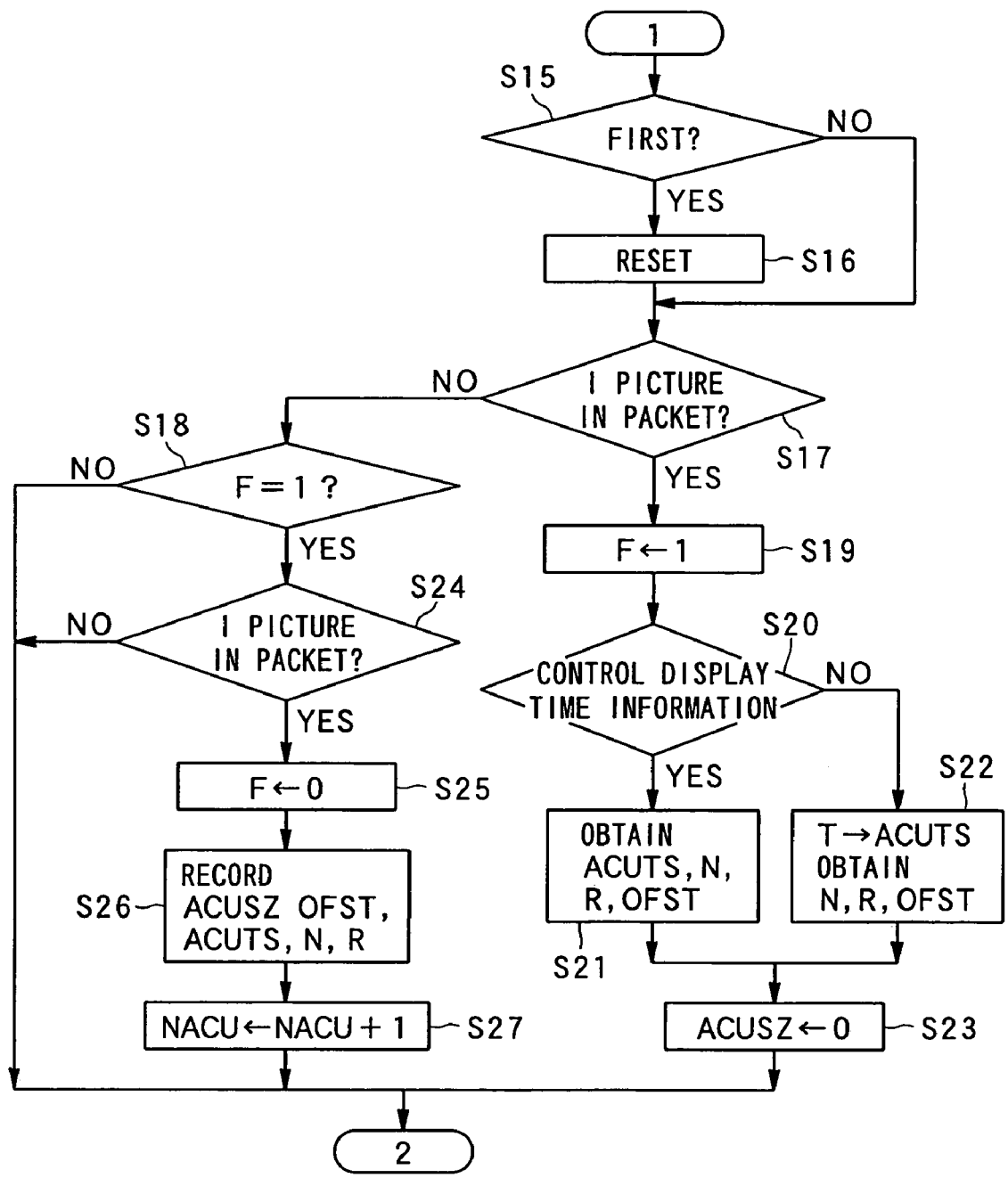
FIG. 11 is a flowchart (II) showing the recording of the embodiment.

Referring to FIGS. 10 and 11, the following will first describe operations of forming the allocation unit ALU and the access unit while receiving AV information as BS digital information via the modem 7 and the digital broadcast receiving circuit 2, and recording the received AV information in the recording format on the hard disk 1.

FIGS. 10 and 11 are flowcharts showing the recording operation.

As shown in FIG. 10, in the recording of the present embodiment, recording is started after resetting a parameter (hereinafter referred to as a parameter N) indicating the number of the allocation unit ALU to be recorded as the unit number information NALU and a parameter (hereinafter referred to as a parameter R) indicating the number of the recording packet RP in the allocation unit ALU.

When the recording is started, it is first confirmed whether AV information inputted as a record from the outside includes image information or not (step S1). When image information is not included (step S1; NO), the access unit effective flag AVLD is set at "0" and stored in a memory (not shown) in the controller 8 (step S3). When image information is included (step S1; YES), the access unit effective flag AVLD is set at "1" and stored in the memory (not shown) in the controller 8 (step S2).

After the access unit effective flag AVLD is completed, the generation of an internal clock signal in the information recording apparatus S is started and clocking is started from the beginning of the recording (hereinafter a clocking result is denoted as T, step S4).

Then, it is confirmed whether the recording is stopped by the operation part 14 (step S5). When the recording is stopped (step S5; YES), the recording is completed as it is. When the recording is not stopped (step S5; NO), it is confirmed whether another packet is received with AV information (step S6). When another packet is not received (step S6; NO), the process returns to step S2 and the processing of step S2 is performed. When another packet is received (step S6; YES), a value of the parameter T at the reception is stored in the memory (not shown) in the controller 8 as a receiving time of the received packet (step S7). Then, it is confirmed whether the packet has been received immediately after the completion of the previous processing shown in FIG. 10, that is, whether the packet should be inserted at the front of the allocation unit ALU to be formed (step SB).

When it is confirmed that the packet should be inserted at the front of the allocation unit ALU (step S8; YES), the value of the parameter T corresponding to the packet is stored as the start time stamp information SATS in the memory (step S9), and then the parameter R is reset (step S10).

Thereafter, it is confirmed whether an access unit is generated in the current recording operation. It is confirmed whether the access unit effective flag AVLD has a value "1" or not (step S11). When the flag AVLD does not have "1" (step S11; NO), the value of the parameter R is incremented by "1" (step S12), the process moves to step S5, and the above operations are repeated.

When it is decided in step SB that the received packet should not be inserted at the front of the allocation unit ALU (step S8; NO), it is confirmed whether the parameter R, which is incremented by repeating the recording operation of FIG. 10, is larger than or equal to a value obtained by dividing a predetermined amount of information to be included in one allocation unit ALU by the size of a packet (192 bytes in the recording of BS digital broadcasting) included in AV information, that is, whether the parameter R is larger than or equal to a predetermined number M of packets to be included in one allocation unit ALU, so that it is confirmed whether the currently received packet should be inserted at the end of the allocation unit ALU (step S13).

When the parameter R is larger than or equal to the value M and thus it is confirmed that the currently received packet should be inserted at the end of the allocation unit ALU (step S13; YES), the value of the parameter T corresponding to the packet is stored in the memory as the end time stamp information EATS (step S14), the value of the parameter N is incremented by "1" (step S45), and the process moves to step S11.

The processing of steps S8, S9, S13, and S14 forms another allocation unit ALU.

When it is decided in step S13 that the currently received packet should not be inserted at the end of the allocation unit ALU (step S13; NO), the process moves to step S11 to repeat the processing so far.

Subsequently, in the processing of step S11, when an access unit is generated in the current recording operation (step S11; YES), the process moves to processing shown in FIG. 11.

That is, when an access unit is generated in the current recording operation (step S11; YES), it is confirmed whether the processing of FIG. 11 is performed for the first time (step S15). When the processing is not performed for the first time, the process moves to step S17. When the processing is performed for the first time (step S15; YES), the number of contents to be included in the generated access unit and a control method (that is, whether control is performed by display time information included in the original packet or a receiving time of the content) are set on the memory (not shown). Further, packet identification information PID for identifying a packet including the content is set on the memory. Moreover, unit information NACU is reset which indicates the number of access units corresponding to each content, a flag F is also reset which indicates whether the I picture in AV information is detected or not (step S16), and the process moves to step S17.

Then, it is confirmed in step S17 whether the currently received packet includes the I picture of a content to be included in the access unit (step S17). When the presence of the I picture is confirmed (step S17; YES), the flag F is set at "1" (step S19) and it is confirmed whether control is performed by display time information based on the setting in step S16 (step S20).

When control is performed by display time information (step S20; YES), the access unit time stamp ACUTS corresponding to a display time in the content, the parameter N, the parameter R, and the byte position from the start of a recording packet RP indicated by the parameter R (recording position information OFST of the content) are obtained from the values of display time information of the content to be included in the access unit (step S21), the access unit information amount information ACUSZ is set at 0 which corresponds to the access unit to include the content (step S23), and the process moves to processing shown in FIG. 10.

When it is decided in step S20 that control is not performed by display time information (step S20; NO), the value of the parameter T at that time (receiving time of the packet) is set on the memory (not shown) as the access unit time stamp ACUTS. Further, the parameter N, the parameter R, and the recording position information OFST of the content are obtained (step S22), and then the process moves to step S23.

When it is decided in step S17 that the currently received packet does not include the I picture of the content to be included in the access unit (step S17; YES), it is confirmed whether the current flag F has a value "1" or not (step S18). When the value is not "1" (step S18; NO), it is decided that the I picture serving as a key in the generation of the access unit is not detected, and the process returns to the processing of FIG. 10. When the current flag F is "1" (step S18; YES), it is confirmed whether the currently received packet includes the I picture or not (step S24). When the I picture is not included (step S24; NO), the process moves to the processing of FIG. 10. When the I picture is included (step S24; YES), the flag F is set at "0" (step S25). The value of the access unit information amount information ACUSZ corresponding to a content for generating the access unit, the value of the access unit time stamp ACUTS, the parameter N at that time, the parameter R, and the recording position information OFST of the content are recorded on the memory (not shown) so that the information and parameters are included in the recording format (step S26), the unit number information NACU corresponding to a content for generating the access unit is incremented by "1" (step S27), and the process returns to the processing of FIG. 10.

Figure 12:
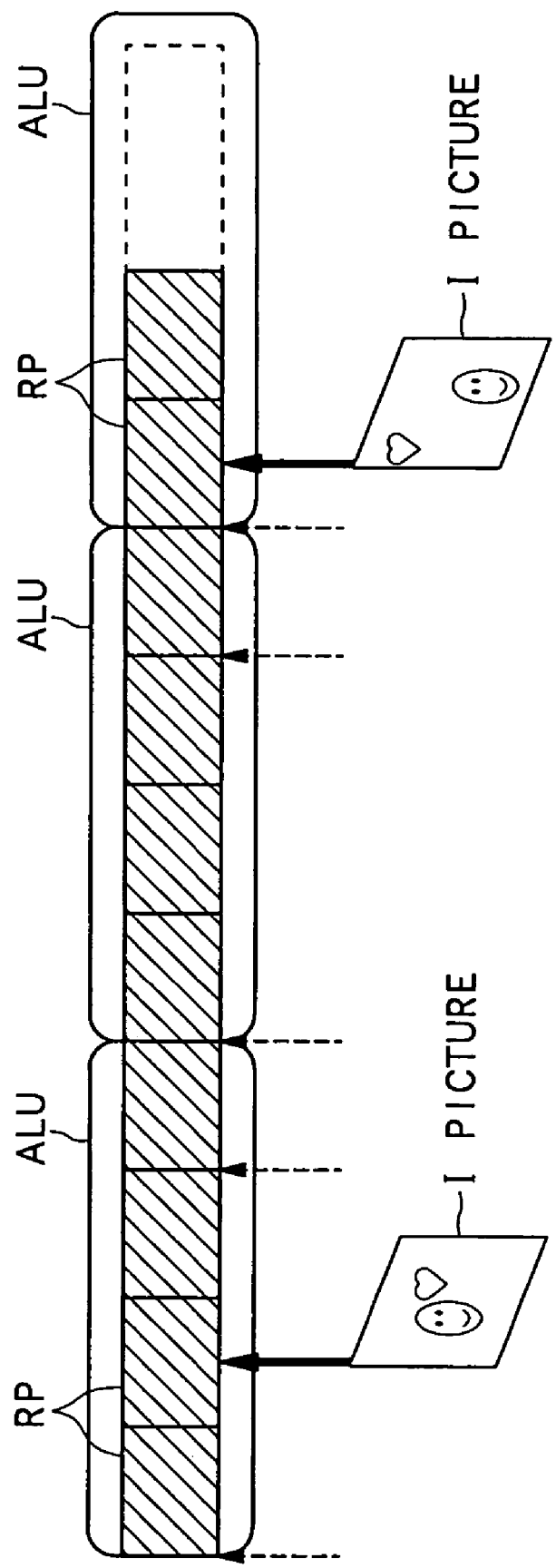
FIG. 12 is a diagram showing a specific example of the present invention.

Since the recording shown in FIGS. 10 and 11 is continued, as illustrate in FIG. 12, the recording format is completed for performing reproduction based on both of the allocation unit ALU and the recording position of the I picture serving as the access unit.

(B) Embodiment of Reproduction

Figure 13:
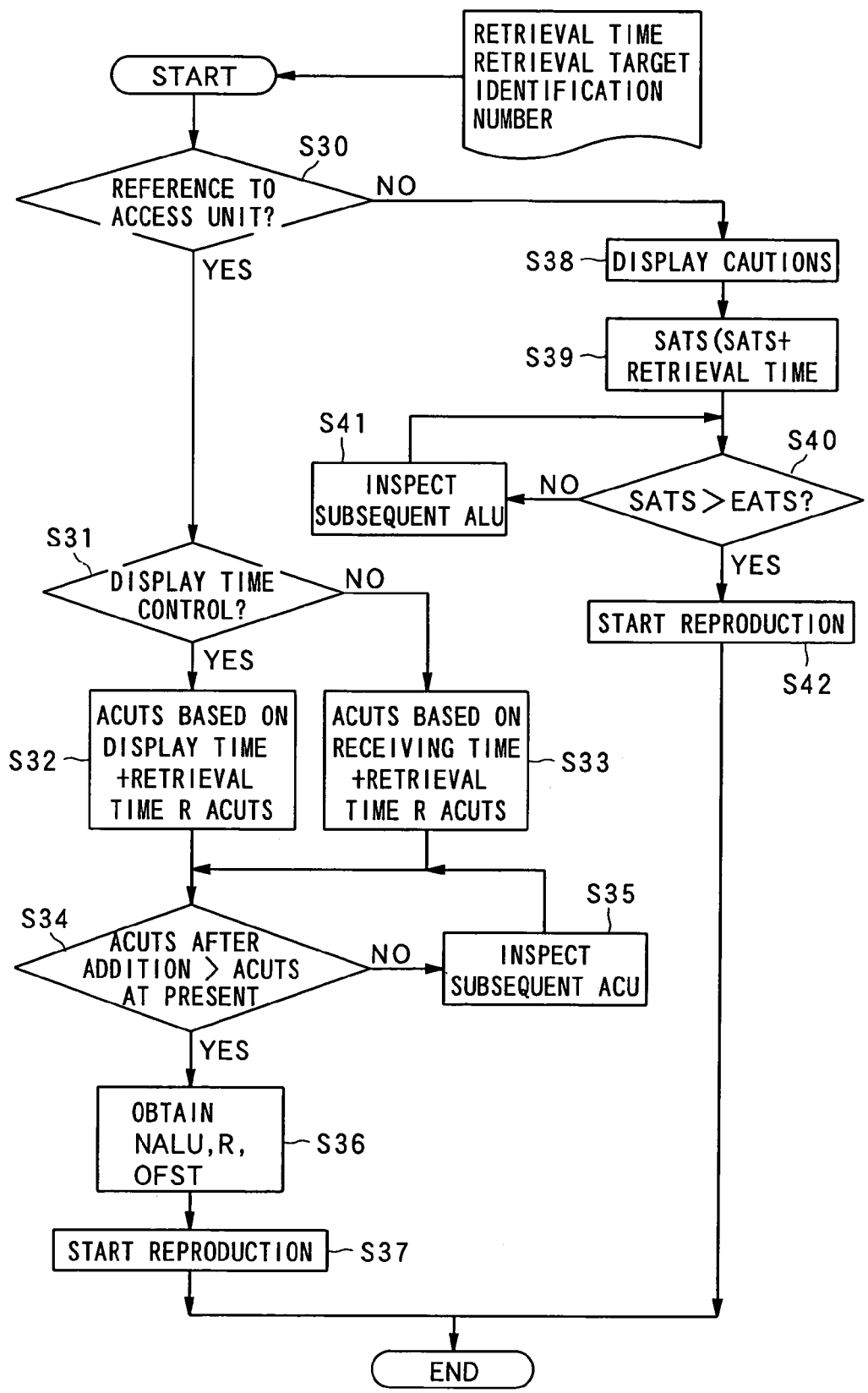
FIG. 13 is a flowchart showing the reproduction of the embodiment.

Referring to FIG. 13, the following will describe an embodiment of the reproduction of AV information recorded in the recording format on the hard disk 1.

FIG. 13 is a flowchart showing the reproduction.

At the start of the reproduction, first an image and the like to be reproduced are specified by operations on the operation part 14. To be specific, time until a retrieval time, an access unit to be retrieved (using access unit information ACUI), and an identification number are specified.

When reproduction is started, it is first confirmed whether a reference can be made to an access unit based on the value of the access unit effective flag AVLD, that is, whether an access unit is inserted in AV information currently recorded on the hard disk 1 (step S30). When the access unit is not available (step S30; NO), the unavailability is displayed as cautions on the display part 13 (step S38). Then, the predetermined retrieval time is added to the start time stamp information SATS in the allocation unit ALU which is referred to at present (step S39).

Subsequently it is confirmed whether the addition result indicates a time preceded by a time of the end time stamp information EATS (step S40). When the addition result does not indicate a time preceded by a time of the end time stamp information EATS (step S40; NO), the processing of step S41 is repeated with the subsequent allocation unit ALU serving as a confirmation target. When the addition result indicates a time preceded by a time of the end time stamp information EATS (step S40; YES), it is decided that an allocation unit ALU to be retrieved is found. Thus, AV information is reproduced from the position (step S42) and the processing is completed.

When it is confirmed in step S30 that an access unit is available (step S30; YES), a reference is made to the access unit handling information ACUM and a control method is obtained (step S31).

When the control method does not use display time information (step S31; NO), the predetermined retrieval time is added to the value of the access unit time stamp ACUTS (a value using a receiving time) in an access unit which is referred to at present (step S33), and the process moves to step S32.

When the control method of the access unit uses display time information (step S31; NO), the predetermined retrieval time is added to the value of the access unit time stamp ACUTS (a value using display time information) in the access unit which is referred to at present (step S32). Then, it is confirmed whether the access unit time stamp ACUTS has a larger value than the addition result (step S34). When the time stamp ACUTS is not larger (step S34; NO), the processing of step S34 is repeated with the subsequent access unit serving as a confirmation target (step S35). When the current access unit time stamp ACUTS has a larger value than the addition result (step S34; YES), it is decided that an access unit to be retrieved is found. Thus, the corresponding unit number information NALU, the parameter R, and the recording position information OFST of the content are obtained from the recording format (step S36) and a retrieval position can be retrieved according to the information and the parameter. Thus, AV information is reproduced from the position (step S37) and the processing is completed.

As described above, according to the processing performed by the information recording apparatus S of the present embodiments, the start time stamp information SATS and the end time stamp information EATS that are used for controlling the reproduction of the allocation unit ALU, and the display time information for controlling the reproduction of the I picture in AV information are recorded on the hard disk 1 with AV information. Thus, it is possible to accurately identify the position of the I picture in AV information and reproduce AV information while increasing convenience in reproducing AV information in allocation units ALU.

In either of the case where reproduction is performed using the receiving time of the I picture and the case where reproduction is performed using the display time information, the reproduction position of AV information can be correctly identified with ease.

Figure 14:
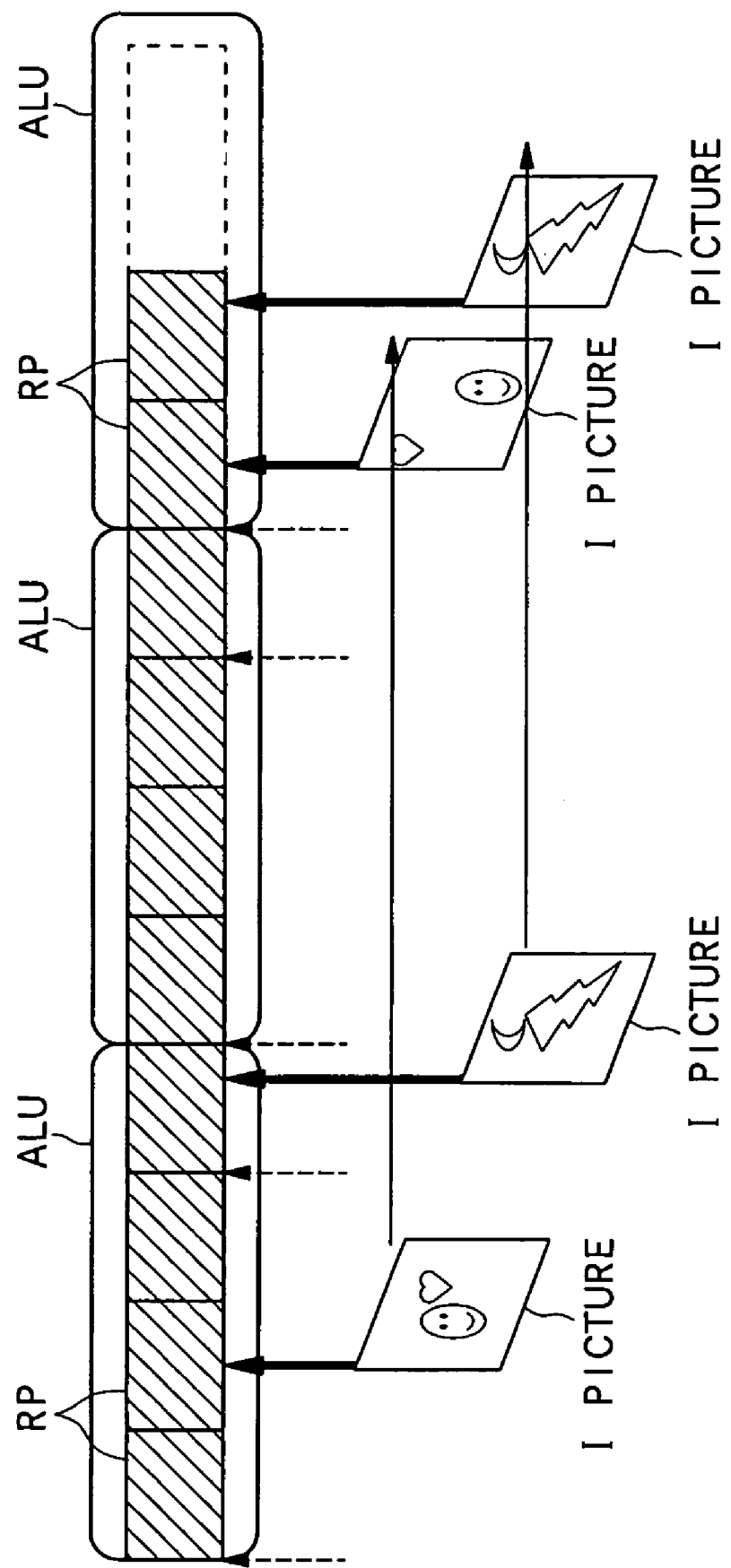
FIG. 14 is a diagram showing another specific example of the present invention.

In addition to these embodiments, also when two or more consecutive pieces of image information are superimposed as shown in FIG. 14, the image information can be accurately controlled and reproduced by both of the allocation unit ALU and the access unit in the present invention.

The present invention is not limited to the embodiments and various modifications can be made.

First, in the embodiments, a video signal and so on are obtained by receiving radio waves of ordinary analog terrestrial TV broadcasting or radio waves of digital satellite broadcasting such as BS digital broadcasting. For example, a video signal and so on can be also obtained from server VOD (video on demand) via the Internet and a private line.

In the embodiments, the hard disk 1 is used as a recording medium. Various recording mediums such as a DVD and a flash memory, on which information can be rewritten, are also applicable.

Moreover, a program corresponding to the flowcharts of FIGS. 10, 11 and 13 is recorded on an information recording medium including a flexible disk or a hard disk. Alternatively the program is obtained via a network such as the Internet and is recorded. The program is read and exercised by a general-purpose microcomputer and so on and thus the microcomputer can be caused to act as the controller 8 of the embodiments.

The invention claimed is:

1. An information recording apparatus for recording, on a recording medium, broadcasting information broadcasted with a plurality of pieces of unit information having a predetermined amount of information, the apparatus comprising:

a constituting device which causes a predetermined number of pieces of the unit information included in the received broadcasting information to constitute a set of unit information, a first generating device for generating receiving time information including a receiving time of a first received piece of the unit information included in the constituted set of unit information and a receiving time of a last received piece of the unit information included in the constituted set of unit information, a detecting device for detecting predetermined specific information included in the unit information, a second generating device for generating, based on the detected specific information, corresponding information which includes corresponding time information indicating a time corresponding to the specific information and corresponding position information indicating a position of the specific information in the set of unit information, a third generating device for generating identification information which indicates whether the receiving time information and the corresponding information are both recorded on the recording medium, and a recording device for recording the generated corresponding information, the generated receiving time information, and the generated identification information on the recording medium.

2. The information recording apparatus according to claim 1, wherein the specific information is predetermined specific image information included in the unit information, and the second generating device uses a receiving time of the specific image information as the time corresponding to the specific information.

3. The information recording apparatus according to claim 1, wherein the specific information is predetermined specific image information included in the unit information, and the second generating device uses, as the specific time, a predetermined specific image information output time which corresponds to the specific image information and is broadcasted with the specific image information, the specific image information output time indicating a time when the specific image information is reproduced and outputted after being recorded on the recording medium.

4. An information reproducing apparatus for reproducing the broadcasting information from the recording medium, the broadcasting information having been recorded on the recording medium by the information recording apparatus according to any one of claims 1 to 3, the reproducing apparatus comprising:

a first detecting device for detecting the identification information from the recording medium, a second detecting device for detecting the recorded corresponding information when the detected identification information indicates that the receiving time information and the corresponding information are both recorded on the recording medium, an identifying device for identifying a recording position of the broadcasting information to be reproduced on the recording medium by using the detected corresponding information, and a reproducing device for detecting and reproducing, from the identified recording position, the broadcasting information recorded on the recording position.

5. A computer-readable medium encoded with computer executable instructions, representing a sequence of instructions, which when executed by a reproducing computer included in a reproducing apparatus, the instructions cause the reproducing computer to function as a first detecting device, a second detecting device, an identifying device, and a reproducing device, the reproducing computer being included in an information reproducing apparatus for reproducing the broadcasting information from the recording medium, the broadcasting information having been recorded on the recording medium by the information recording apparatus according to any one of claims 1 to 3, the first detecting device detecting the identification information from the recording medium, the second detecting device detecting the recorded corresponding information when the detected identification information indicates that the receiving time information and the corresponding information are both recorded on the recording medium, the identifying device identifying a recording position of the broadcasting information to be reproduced on the recording medium by using the detected corresponding information, and the reproducing device detecting and reproducing, from the identified recording position, the broadcasting information recorded on the recording position.

6. The information recording apparatus according to claim 1, wherein the specific information is an I-picture of the MPEG included in the unit information.

7. An information recording method for recording, on a recording medium, broadcasting information broadcasted with a plurality of pieces of unit information having a predetermined amount of information, the method comprising:
a constituting process of causing a predetermined number of pieces of the unit information included in the received broadcasting information to constitute a set of unit information,
a first generating process of generating receiving time information including a receiving time of a first received piece of the unit information included in the constituted set of unit information and a receiving time of a last received piece of the unit information included in the constituted set of unit information,
a detecting process of detecting predetermined specific information included in the unit information,
a second generating process of generating, based on the detected specific information, corresponding information which includes corresponding time information indicating a time corresponding to the specific information and corresponding position information indicating a position of the specific information in the set of unit information,
a third generating process of generating identification information which indicates whether the receiving time information and the corresponding information are both recorded on the recording medium, and
a recording process of recording the generated corresponding information, the generated receiving time information, and the generated identification information on the recording medium.

8. The information recording method according to claim 7, wherein the specific information is predetermined specific image information included in the unit information, and
the second generating process uses a receiving time of the specific image information as the time corresponding to the specific information.

9. The information recording method according to claim 7, wherein the specific information is predetermined specific image information included in the unit information, and
the second generating process uses, as the specific time, a predetermined specific image information output time which corresponds to the specific image information and is broadcasted with the specific image information, the specific image information output time indicating a time when the specific image information is reproduced and outputted after being recorded on the recording medium.

10. An information reproducing method for reproducing the broadcasting information from the recording medium, the broadcasting information having been recorded on the recording medium by the information recording method according to claim 7 or 8, the reproducing method comprising:
a first detecting process of detecting the identification information from the recording medium,
a second detecting process of detecting the recorded corresponding information when the detected identification information indicates that the receiving time information and the corresponding information are both recorded on the recording medium,
an identifying process of identifying a recording position of the broadcasting information to be reproduced on the recording medium by using the detected corresponding information, and
a reproducing process of detecting and reproducing, from the identified recording position, the broadcasting information recorded on the recording position.

11. The information recording method according to claim 7, wherein the specific information is an I-picture of the MPEG included in the unit information.

12. A computer-readable medium encoded with computer executable instruction, represnting a series of instructions, which when executed by a recording computer included in a recording apparatus, the instructions cause the a recording computer to function as a constituting device, a first generating device, a detecting device, a second generating device, a third generating device, and a recording device, the recording computer being included in an information recording apparatus for recording, on a recording medium, broadcasting information broadcasted with a plurality of pieces of unit information having a predetermined amount of information, the constituting device causing a predetermined number of pieces of the unit information included in the received broadcasting information to constitute a set of unit information,
the first generating device generating receiving time information including a receiving time of a first received piece of the unit information included in the constituted set of unit information and a receiving time of a last received piece of the unit information included in the constituted set of unit information,
the detecting device detecting predetermined specific information included in the unit information,
the second generating device generating, based on the detected specific information, corresponding information which includes corresponding time information indicating a time corresponding to the specific information and corresponding position information indicating a position of the specific information in the set of unit information,
the third generating device generating identification information which indicates whether the receiving time information and the corresponding information are both recorded on the recording medium, and
the recording device recording the generated corresponding information, the generated receiving time information, and the generated identification information on the recording medium.

13. The computer-readable medium according to claim 12, wherein the specific information is predetermined specific image information included in the unit information, and
the recording computer acting as the second generating device is caused to operate using a receiving time of the specific image information as the time corresponding to the specific information.

14. The computer-readable medium according to claim 12, wherein the specific information is predetermined specific image information included in the unit information, and
the recording computer acting as the second generating device is caused to operate using, as the specific time, a predetermined specific image information output time which corresponds to the specific image information and is broadcasted with the specific image information, the specific image information output time indicating a time when the specific image information is reproduced and outputted after being recorded on the recording medium.

15. The computer-readable medium according to claim 12, wherein the specific information is an I-picture of the MPEG included in the unit information.

* * * * *